(12) United States Patent
Stewart

(10) Patent No.: US 8,969,482 B2
(45) Date of Patent: Mar. 3, 2015

(54) DYNAMIC MODULATION OF METALLOCENE CATALYSTS

(71) Applicant: ExxonMobil Chemical Patents Inc., Baytown, TX (US)

(72) Inventor: Ian C. Stewart, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 12 days.

(21) Appl. No.: 13/623,263

(22) Filed: Sep. 20, 2012

(65) Prior Publication Data

US 2013/0085232 A1    Apr. 4, 2013

Related U.S. Application Data

(60) Provisional application No. 61/541,448, filed on Sep. 30, 2011.

(30) Foreign Application Priority Data

Nov. 8, 2011   (EP) ..................................... 11188167

(51) Int. Cl.
*C08F 210/02* (2006.01)
*C08F 255/02* (2006.01)
*C08F 10/00* (2006.01)
*C08F 4/659* (2006.01)
*C08F 297/08* (2006.01)

(52) U.S. Cl.
CPC .............. *C08F 10/00* (2013.01); *C08F 4/65908* (2013.01); *C08F 2410/01* (2013.01); *C08F 297/083* (2013.01)
USPC ......................................... 525/245; 526/134

(58) Field of Classification Search
USPC ......................................................... 526/145
See application file for complete search history.

(56) References Cited

U.S. PATENT DOCUMENTS

| | | | |
|---|---|---|---|
| 3,990,994 A * | 11/1976 | Appleyard et al. | 526/95 |
| 5,153,157 A | 10/1992 | Hlatky et al. | |
| 5,416,177 A | 5/1995 | Siedle et al. | |
| 5,453,410 A | 9/1995 | Kolthammer et al. | |
| 5,547,675 A | 8/1996 | Canich | |

(Continued)

FOREIGN PATENT DOCUMENTS

| | | |
|---|---|---|
| EP | 0 277 004 | 8/1988 |
| EP | 0 573 120 | 12/1993 |

(Continued)

OTHER PUBLICATIONS

Arriola et al., *Catalytic Production of Olefin Block Copolymers via Chain Shuttling Polymerization*, Science, 2006, vol. 312, pp. 714-719.

(Continued)

*Primary Examiner* — Ling Choi
*Assistant Examiner* — Catherine S Branch
(74) *Attorney, Agent, or Firm* — Catherine L. Bell

(57) ABSTRACT

This invention relates to a process to alter comonomer distribution in a copolymer (as compared to a copolymer made absent the Lewis base modifier) comprising contacting ethylene and one or more $C_3$ to $C_{40}$ comonomers; with a catalyst system comprising: 1) a Lewis base modifier; 2) an activator; and 3) a bridged bisindenyl group 4 transition metal metallocene catalyst compound having a hydrogen atom at least one 2 position.

50 Claims, 3 Drawing Sheets

(56) References Cited

U.S. PATENT DOCUMENTS

| | | | |
|---|---|---|---|
| 5,817,590 | A | 10/1998 | Hasegawa et al. |
| 6,175,409 | B1 | 1/2001 | Nielsen et al. |
| 6,260,407 | B1 | 7/2001 | Petro et al. |
| 6,294,388 | B1 | 9/2001 | Petro |
| 6,306,658 | B1 | 10/2001 | Turner et al. |
| 6,406,632 | B1 | 6/2002 | Safir et al. |
| 6,436,292 | B1 | 8/2002 | Petro |
| 6,454,947 | B1 | 9/2002 | Safir et al. |
| 6,455,316 | B1 | 9/2002 | Turner et al. |
| 6,461,515 | B1 | 10/2002 | Safir et al. |
| 6,475,391 | B2 | 11/2002 | Safir et al. |
| 6,489,168 | B1 | 12/2002 | Wang et al. |
| 6,491,816 | B2 | 12/2002 | Petro |
| 6,491,823 | B1 | 12/2002 | Safir et al. |
| 6,608,224 | B2 | 8/2003 | Resconi et al. |
| 6,723,676 | B2 | 4/2004 | Becke et al. |
| 7,101,940 | B2 | 9/2006 | Schottek et al. |
| 7,247,686 | B2 | 7/2007 | Ishigaki et al. |
| 7,314,903 | B2 | 1/2008 | Resconi et al. |
| 7,524,447 | B2 | 4/2009 | Asthana et al. |
| 7,553,917 | B2 | 6/2009 | Beigzadeh et al. |
| 7,592,401 | B2 | 9/2009 | Lee et al. |
| 7,794,917 | B2 | 9/2010 | Mori et al. |
| 7,799,879 | B2 | 9/2010 | Crowther et al. |
| 7,985,816 | B2 | 7/2011 | Crowther et al. |
| 2003/0069426 | A1 | 4/2003 | Schottek et al. |
| 2003/0149202 | A1 | 8/2003 | Kao et al. |
| 2005/0176578 | A1* | 8/2005 | Neithamer et al. ........... 502/155 |
| 2010/0029873 | A1 | 2/2010 | Crowther et al. |
| 2011/0076454 | A1 | 3/2011 | Hitomi et al. |

FOREIGN PATENT DOCUMENTS

| | | |
|---|---|---|
| EP | 0 630 910 | 12/1994 |
| KR | 10 2011 0013286 | 2/2011 |
| WO | WO 94/07928 | 4/1984 |
| WO | WO 91/02012 | 2/1991 |
| WO | WO 95/14044 | 5/1995 |
| WO | WO 00/09255 | 2/2000 |
| WO | WO 2005/016980 | 2/2005 |

OTHER PUBLICATIONS

Bentley, *Nucleophilicity Parameters for Strong Nucleophiles in Dimethyl Sulfoxide. A Direct Alternative to the s(E+N) Equation*, Journal of Physical Organic Chemistry, 2011, vol. 24, pp. 282-291.

Chien et al., *Olefin Copolymerization with Metallocene Catalysts. II. Kinetics, Cocatalyst, and Additives*, Journal of Polymer Science: Part A: Polymer Chemistry, 1991, vol. 29, pp. 1595-1601.

Ferreira et al., *Effect of Co- and Non-Copolymerizable Lewis Bases in Propylene Polymerization with $EtInd_2ZrCl_2/MAO$*, Macromolecular Chemistry and Physics, 2001, vol. 202, No. 6, pp. 830-839.

Giardello et al., *Chiral $C_1$-Symmetric Group 4 Metallocenes as Catalysts for Stereoregular α-Olefin Polymerization. Metal, Ancillary Ligand, and Counteranion Effects*, Journal of the American Chemical Society, 1995, vol. 117, No. 49, pp. 12114-12129.

Murphy et al., *A Fully Integrated High-Throughput Screening Methodology for the Discovery of New Polyolefin Catalysts: Discovery of a New Class of Temperature Single Site Group (IV) Copolymerization Catalyts*, Journal of American Chemical Society, 2003, vol. 125, No. 14, pp. 4306-4317.

Sanginov et al., *Metallocene Systems in Propylene Polymerization: Effect of Triisobutylaluminum and Lewis Bases on the Behavior of Catalysts and Properties of Polymers*, Polymer Science, Seriers A, 2006, vol. 48, No. 2, pp. 99-106.

Stehling et al., *Metallocene/Borate-Catalyzed Copolymerization of 5-N,N-Diisopropylamino-1-pentene with 1-Hexene or 4-Methyl-1-pentene*, Macromolecules, 1999, vol. 32, No. 1, pp. 14-20.

Dove, A.P.; Kiesewetter, E.T.; Ottenwaelder, X.; Waymouth, R.M. *Organometallics* 2009, 28, 405-412.

Dove, A.P.; Xie, X.; Waymouth, R.M. *Chem. Commun.* 2005, 2152-2154.

Min, E.Y.J.; Byers, J.A.; Bercaw, J.E. *Organometallics* 2008, 27, 2179-2188.

Nabika, M.; Katayama, H.; Watanabe, T.; Kawamura-Kuribayashi, H.; Yanagi K.; Imai, A. *Organometallics* 2009, 28, 3785-3792.

Smolensky, E.; Kapon, M.; Woolins, J.D.; Eisen, M.S. *Organometallics* 2005, 4, 3255-3265.

Yoder, J.C.; Bercaw, J.E. *J. Am. Chem. Soc.* 2002, 124, 2548-2555.

\* cited by examiner

DYNAMIC MODULATION OF METALLOCENE CATALYSTS

PRIORITY CLAIM

This application claims the benefit of and priority to U.S. Ser. No. 61/541,448, filed Sep. 30, 2011 and EP 11188167.8, filed Nov. 8, 2011.

FIELD OF THE INVENTION

This invention relates to Lewis base modifiers for metallocene catalyst systems and use thereof.

BACKGROUND OF THE INVENTION

Olefin polymerization catalysts are of great use in industry. Hence, there is interest in finding new catalyst systems, including catalyst activators that increase the commercial usefulness of the catalyst and allow the production of polymers having improved properties.

Catalysts for olefin polymerization are often based on metallocenes as catalyst precursors, which are activated either with the help of an alumoxane, or with an activator containing a non-coordinating anion.

EP 0 277 004 A1 is one of the first documents disclosing polymerization catalysts comprising a bis-cyclopentadienyl metallocene compound that is activated by reaction with a secondary, ionic component comprising a non-coordinating anion (NCA) and a counter-cation. The NCA is, on the one hand, capable of stabilizing the active cationic catalyst species, but on the other hand only weakly coordinates to the metal center and thus can be displaced by a monomer to be incorporated into the polymer chain. The activators disclosed are ion pairs of an ammonium or phosphonium cation and a borate anion as the NCA. The cations disclosed are alkyl and/or aryl ammonium or phosphonium species. EP 0 277 004 A1 states that the conjugate base of the activator cation may be a neutral component which stays in solution and which preferably does not coordinate to the metal cation. Therefore, it is suggested to use relatively bulky conjugate Lewis bases to avoid coordination to and, thus, interfering with the active catalyst.

WO 91/02012 discloses the polymerization of high Mw, narrow molecular weight distribution polyethylene using a metallocene/activator system, wherein the activator comprises an NCA and an ammonium cation.

M. A. Giardello, M. S. Eisen, Ch. L. Stern and T. J. Marks in J. Am. Chem. Soc., 1995, 117, 12114-12129, report on the preparation of cationic polymerization catalysts from metallocene compounds, using various types of activators, including methylalumoxane (MAO) and NCA/cation pairs. It is suggested that, although the main focus in activator choice is on the NCA, the choice of the amine in the activator cation may also be important, as certain amines could coordinate to the metallocene cation and, thus, diminish its catalytic activity. In accordance with this suggestion is another finding also reported in this article, which is that the presence of an exogenous amine base significantly depresses the Mw of the polymer product as well as the polymerization activity (see Examples 9 and 10 of Table 3, page 12124).

EP 0 630 910 A1 teaches the use of free Lewis bases to control the activity of olefin polymerization catalysts. Lewis bases can, if necessary, terminate the catalytic reaction completely. However, the termination is reversible upon addition of alumoxane. The system disclosed thus comprises a metallocene compound, a Lewis base and an alumoxane. EP 0 630 910 A1 indicates that the metallocene cation-Lewis base complex is inactive for olefin polymerization because the olefin is unable to compete with the Lewis base for the coordination site at the metal. The Lewis bases used are, among others, amines, ethers, or phosphines in combination with a cyclopentadienyl-fluorenyl metallocene.

Despite the earlier teachings in the art as reported above, several authors and patent applications teach the separate addition of an amine base to the system comprising the metallocene compound, the cation/NCA activator, and, optionally, an organoaluminum compound. See for example U.S. Pat. No. 5,817,590 and E. A. Sanginov, A. N. Panin, S. L. Saratovskikh, N. M. Bravaya, in Polymer Science, Series A (2006), 48(2), 99-106. None of these references, however, disclose altering comonomer incorporation.

U.S. Pat. No. 5,416,177 discloses the use of metallocene compounds typically 1:1 molar ratios combined with activators comprising tris(pentafluorophenyl)borane and at least one complexing compound, such as water, alcohols, mercaptans, silanols, and oximes, for the polymerization of olefins, in particular 1-hexene. Similar catalyst systems are disclosed in WO 2005/016980.

WO 01/62764, WO 01/68718, and WO 2004/005360 disclose co-catalysts for use in olefin polymerization, wherein the co-catalysts comprise a cation derived from an aromatic, nitrogen-containing Lewis base, such as pyrrole, imidazole, or indole, and NCAs, particularly borates.

WO 01/48035 relates to catalyst systems comprising an organometallic compound (preferably a metallocene), a Lewis base, a support, and an activator. The activator is an ion pair, the anion of which is a borate, such as tetrakis(pentafluorophenyl)borate. The cation is an ammonium cation, such as a trialkylammonium.

WO 03/035708 seeks to provide a cocatalyst component for use in combination with olefin polymerization catalyst precursors, particularly metallocenes that result in highly active polymerization catalysts with good storage stability. The cocatalysts disclosed are composed of an ammonium cation and a NCA, and are supported on a fine particle carrier.

"Metallocene/Borate-Catalyzed Copolymerization of 5-N,N-Diisopropylamino-1-pentene with 1-Hexene or 4-Methyl-1-pentene" Udo M. Stehling, Kevin M. Stein, David Fischer, and Robert M. Waymouth, *Macromolecules* 1999, 32, 14-20 indicates that certain amines, when used as comonomers, had the effect of inhibiting the rate of total monomer conversion.

"Olefin Copolymerization with Metallocene Catalysts. II. Kinetics, Cocatalyst, and Additives", James C. W. Chien and Dawei He, Journal of Polymer Science: Part A Polymer Chemistry, Vol. 29, 1595-1601 (1991), John Wiley & Sons, Inc., discloses that the molecular weight of ethylene/propylene copolymer is slightly increased by addition of Lewis base modifier but at the expense of lowered catalytic activity and increase in ethylene content in the copolymer in an ethylene/propylene copolymerization catalyzed by ethylene bis (indenyl)-$ZrCl_2$/methylaluminoxane.

"Effect of Co- and Non-Copolymerizable Lewis Bases in Propylene Polymerization with $EtInd_2ZrCl_2$/MAO", M. L. Ferreira, P. G. Belelli, D. E. Damiani, Macromol. Chem.

Phys., 2001, 202, 830-839 discloses that with noncopolymerizable Lewis bases, the activity and the molar mass of poly(propylene) are diminished.

U.S. Pat. No. 7,799,879 discloses an activator comprising a non-coordinating anion and a preferably cyclic cation, where the cation is represented by the formula (1) or (2): $[R^1R^2R^3AH]^+$ (1) or $[R_nAH]^+$ (2), wherein A is nitrogen or phosphorus.

Furthermore, combinations of activators have been described in U.S. Pat. Nos. 5,153,157 and 5,453,410, European publication EP 0 573 120 B1, and PCT publications WO 94/07928 and WO 95/14044. These documents all discuss the use of an alumoxane in combination with an ionizing activator.

U.S. Pat. No. 7,985,816 discloses trimethylammonium containing non-coordinating anion activators.

Other references of interest include: U.S. Pat. Nos. 7,794,917; 7,592,401; 7,524,447; 6,723,676; 7,553,917; and U.S. Patent Application Publication Nos. 2011/0076454; and 2010/0029873.

There is still a need in the art for new and improved catalyst systems for the polymerization of olefins, in order to achieve specific polymer properties, such as high melting point, high molecular weights, to increase conversion or comonomer incorporation, or to alter comonomer distribution without deteriorating the resulting polymer's properties.

It is therefore an object of the present invention to provide a process and a catalyst system for use in a process for the polymerization of olefins, especially ethylene, wherein the resulting polymers have good melting points and comonomer distribution. Ideally, such catalyst system should also exhibit high catalytic activity under commercial polymerization conditions.

In another embodiment, it is an object of the present invention to provide a process and a catalyst system for use in a process for the polymerization of olefins, especially ethylene, to make block copolymers.

SUMMARY OF THE INVENTION

This invention relates to a process to alter comonomer distribution in a copolymer (as compared to a copolymer made under the same conditions absent the Lewis base modifier) comprising contacting ethylene and one or more $C_3$ to $C_{40}$ comonomers; with a catalyst system comprising:

1) a Lewis base modifier present at greater than 1:1 molar ratio of Lewis base modifier to activator, where the Lewis base modifier is represented by the formula:

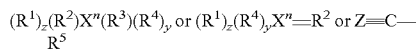

where, z is 0 or 1, y is 0 or 1, n is the valence of X and is 2 or 3, and z+y+2=n, X is a group 15-16 atom excluding oxygen, Z is N or P, $R^1$, $R^2$, $R^3$, $R^4$, and $R^5$ each, independently, are hydrogen, a heteroatom, a substituted heteroatom, or a substituted or unsubstituted alkyl or substituted or unsubstituted aryl, and $R^1$, $R^2$, $R^3$, and $R^4$ may form single or multinuclear rings with each other;

2) an activator; and 3) a metallocene catalyst compound represented by the formula:

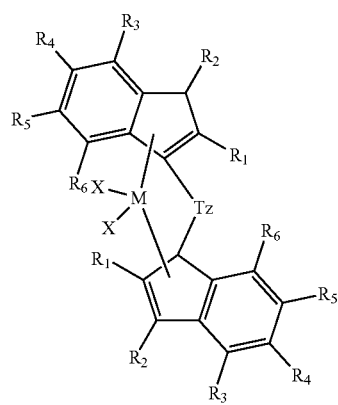

where:

M is a Group transition 4 metal; z is 1 indicating the presence of a bridging group T, each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system), each $R_1$ is, independently, hydrogen, or a $C_1$ to $C_{10}$ alkyl group, provided that at least one $R_1$ group is H; each $R_2$ is, independently, hydrogen, or a $C_1$ to $C_{10}$ alkyl group; each $R_3$, $R_4$, $R_5$, and $R_6$ is, independently, hydrogen, a substituted hydrocarbyl group, an unsubstituted hydrocarbyl group, or a heteroatom, provided that any of adjacent $R_3$, $R_4$, $R_5$, and $R_6$ groups may form a fused ring or multicenter fused ring system where the rings may be aromatic, partially saturated or saturated.

This invention also relates to a process to alter comonomer distribution in a copolymer comprising contacting ethylene and one or more $C_3$ to $C_{40}$ comonomers; with a catalyst system comprising:

1) a Lewis base modifier present at greater than 1:1 molar ratio of Lewis base modifier to activator, where the Lewis base modifier is represented by the formula:

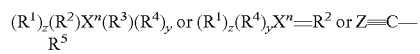

where, z is 0 or 1, y is 0 or 1, n is the valence of X and is 2 or 3 and z+y+2=n, X is a group 15-16 atom excluding oxygen, Z is N or P, $R^1$, $R^2$, $R^3$, $R^4$, and $R^5$ each, independently, are hydrogen, a heteroatom, a substituted heteroatom, or a substituted or unsubstituted alkyl or substituted or unsubstituted aryl, and $R^1$, $R^2$, $R^3$, and $R^4$ may form single or multinuclear rings with each other;

2) an activator; and
3) a metallocene catalyst compound represented by the formula:

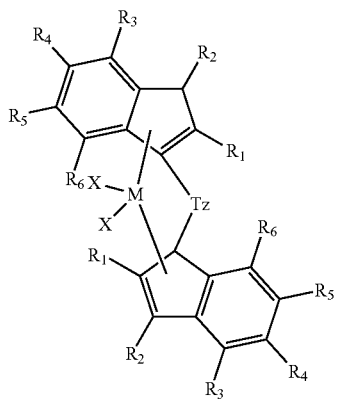

where:
M is a Group transition 4 metal; z is 1 indicating the presence of a bridging group T, each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system), each $R_1$ is, independently, hydrogen, or a $C_1$ to $C_{10}$ alkyl group, provided that at least one $R_1$ group is H; each $R_2$ is, independently, hydrogen, or a $C_1$ to $C_{10}$ alkyl group; each $R_3$, $R_4$, $R_5$, and $R_6$ is, independently, hydrogen, a substituted hydrocarbyl group, an unsubstituted hydrocarbyl group, or a heteroatom, provided that any of adjacent $R_3$, $R_4$, $R_5$, and $R_6$ groups may form a fused ring or multicenter fused ring system where the rings may be aromatic, partially saturated or saturated; and thereafter altering the Lewis base present in the reaction zone.

DETAILED DESCRIPTION

Figure 1:
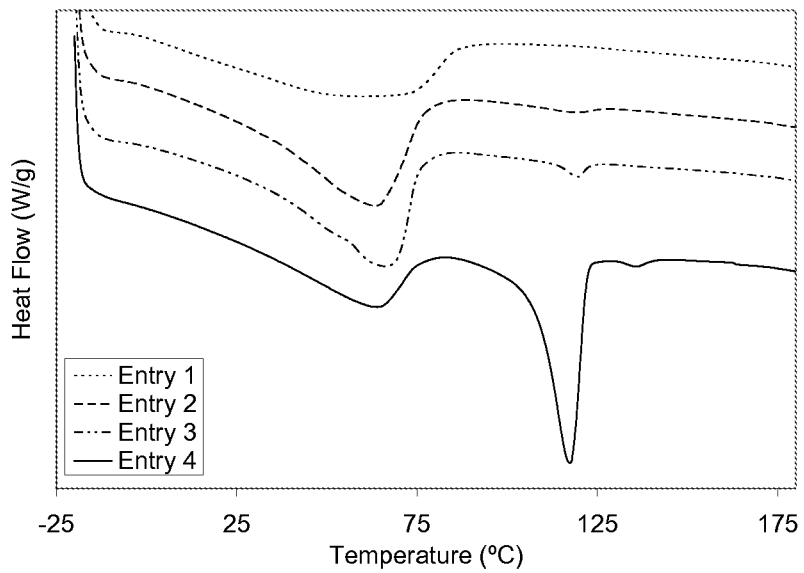
FIG. 1 is a graph of DSC traces of products from Table 1, Examples 1 to 4.

For the purposes of this invention and the claims thereto, the new numbering scheme for the Periodic Table Groups is used as in CHEMICAL AND ENGINEERING NEWS, 63(5), pg. 27 (1985). Therefore, a "Group 4 metal" is an element from Group 4 of the Periodic Table.

"Catalyst productivity" is a measure of how many grams of polymer (P) are produced using a polymerization catalyst comprising W g of catalyst (cat), over a period of time of T hours; and may be expressed by the following formula: P/(T×W) and expressed in units of $gPgcat^{-1}hr^{-1}$. Conversion is the amount of monomer that is converted to polymer product, and is reported as mol % and is calculated based on the polymer yield and the amount of monomer fed into the reactor. Catalyst activity is a measure of how active the catalyst is and is reported as the mass of product polymer (P) produced per mole of catalyst (cat) used (kgP/molcat).

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers and the like. An oligomer is typically a polymer having a low molecular weight (such an Mn of less than 25,000 g/mol, preferably less than 2,500 g/mol) or a low number of mer units (such as 75 mer units or less). An "ethylene polymer" or "ethylene copolymer" is a polymer or copolymer comprising at least 50 mol % ethylene derived units. A "propylene polymer" or "propylene copolymer" is a polymer or copolymer comprising at least 50 mol % propylene derived units.

For the purposes of this invention, ethylene shall be considered an α-olefin. An "alkyl" group is a linear, branched, or cyclic radical of carbon and hydrogen having at least one double bond.

For purposes of this invention and claims thereto, the term "substituted" means that a hydrogen group has been replaced with a heteroatom, or a heteroatom containing group. For example, a "substituted hydrocarbyl" is a radical made of carbon and hydrogen where at least one hydrogen is replaced by a heteroatom or heteroatom containing group.

$^{13}C$ NMR spectroscopic analysis is conducted as follows: Polymer samples for $^{13}C$ NMR spectroscopy are dissolved with heating in $d_2$-1,1,2,2-tetrachloroethane at concentrations between 10 wt % to 15 wt % prior to being inserted into the spectrometer magnet. $^{13}C$ NMR data is collected at 120° C. in a 10 mm probe using a Varian spectrometer with a $^1$Hydrogen frequency of 400 MHz. A 90 degree pulse, an acquisition time adjusted to give a digital resolution between 0.1 and 0.12 Hz, at least a 10 second pulse acquisition delay time with continuous broadband proton decoupling using swept square wave modulation without gating, is employed during the entire acquisition period. The spectra are acquired using time averaging to provide a signal to noise level adequate to measure the signals of interest. $^{13}C$ NMR Chemical Shift Assignments and calculations involved in characterizing polymers are made as outlined in the work of M. R. Seger and G. Maciel, "Quantitative $^{13}C$ NMR Analysis of Sequence Distributions in Poly(ethylene-co-1-hexene)", 2004, Anal. Chem., Vol. 76, pp. 5734-5747; J. C. Randall, "Polymer Sequence Determination: Carbon-13 NMR Method" Academic Press, New York, 1977; and K. L. Koenig "Chemical Microstructure of Polymer Chains," Robert E. Krieger Publishing Company, Florida 1990. For example, triad concentrations in ethylene hexene copolymers are determined by spectral integration and normalized to give the mole fraction of each triad: ethylene-ethylene-ethylene (EEE), ethylene-ethylene-hexene (EEH), ethylene-hexene-ethylene (EHE), hexene-ethylene-ethylene (HEE), hexene-ethylene-hexene (HEH), hexene-hexene-hexene (HHH). The observed triad concentrations are converted into the following diad concentrations: ethylene-ethylene (EE), hexene-hexene (HH) and ethylene-hexene (EH). The diad concentrations are determined by the following equations, where A represents one monomer and B the other.

$$[AA]=[AAA]+[AAB]/2$$

$$[AB]=2*[ABA]+[BBA]$$

The diad concentrations are then used to establish $r_1 r_2$ as follows:

$$r_1 r_2 = 4 * \frac{EE * HH}{(EH)^2}$$

Mole percent 1-hexene (Mol % comonomer) is determined as follows:

Mole Percent Hexene=(HHH+HHE+EHE)*100

Run Number is determined as follows:

$$\text{Run Number} = \left(HEH + \frac{1}{2} * HEE\right) * 100$$

Average ethylene run length is calculated by dividing the comonomer content by the run number. Average Ethylene Run Length=(HEH+EEH+EEE)/(run number).

"Butyls" per 1000 carbons is calculated by dividing the 1-hexene-centered triads by the sum of twice the ethylene-centered triads plus six times the 1-hexene-centered triads and the resultant quotient multiplying by 1000.

Butyls per 1000 Carbons =

$$\frac{HHH + HHE + EHE}{6*(HHH + HHE + EHE) + 2(HEH + EEH + EEE)} * 1000$$

In ethylene copolymers where the comonomer is not hexene, the same procedure as above is employed and the H in the above examples would represent the comonomer. For example, in an ethylene-butene copolymer the H would represent the butene monomer, in an ethylene-octene copolymer the H would represent the octene monomer, etc. Likewise, in situations where there is more than one comonomer, then the H in the formulae above would represent all the comonomers. Further, when making comparisons of the copolymers produced herein to a random copolymer, a Bernoullian distribution is used to represent the random copolymer as set out in K. L. Koenig "Chemical Microstructure of Polymer Chains", Robert E. Krieger Publishing Company, Florida, 1990.

Proton ($^1$H) NMR data is collected at 120° C. in a 5 mm probe using a Varian Spectrometer with a $^1$Hydrogen frequency of at least 400 MHz. The data is recorded using a maximum pulse width of 45 degrees, 8 seconds between pulses and signal averaging 120 transients.

As used herein, Mn is number average molecular weight, Mw is weight average molecular weight, and Mz is z average molecular weight, wt % is weight percent, and mol % is mole percent. Molecular weight distribution (MWD), also referred to as polydispersity, is defined to be Mw divided by Mn. Unless otherwise noted, all molecular weight units (e.g., Mw, Mn, Mz) are g/mol. The following abbreviations may be used herein: Me is methyl, Et is ethyl, Pr is propyl, nPr is n-propyl, iPr is isopropyl, Bu is butyl, nBu is normal butyl, iBu is isobutyl, sBu is sec-butyl, tBu is tert-butyl, Oct is octyl, Ph is phenyl, Bn is benzyl, MAO is methylalumoxane and is defined to have an Mw of 58.06 g/mol.

Temperature rising elution fractionation (TREF) analysis is conducted according to the method described in the "TREF User Manual" for the Polymer ChAR CRYSTAF-TREF 200+ instrument using the Windows version 2007.c1 of the "TREF" software. The sample to be analyzed is dissolved in ortho-dichlorobenzene at a concentration of 4 mg/ml, and a small volume (0.50 mL) of the sample is allowed to crystallize in a column containing an inert support (stainless steel shot) by slowly reducing the temperature to −15° C. at a cooling rate of 1° C./min. The column is equipped with an infrared detector (Polymer ChAR IR4) capable of generating an absorbance signal that is proportional to the concentration of polymer in solution. A TREF chromatogram curve (also referred to as a trace) is then generated by eluting (1 ml/min) the crystallized polymer sample from the column by slowly increasing the temperature of the eluting solvent (ortho-dichlorobenzene) from −15° C. to 140° C. at a rate of 2° C./min.

This invention relates to a process to alter comonomer distribution (preferably increase blocky character) in a copolymer (as compared to a copolymer made absent the Lewis base modifier under the same polymerization conditions) comprising contacting ethylene and one or more $C_3$ to $C_{40}$ comonomers (preferably $C_3$ to $C_{20}$ alpha olefins, preferably $C_3$ to $C_{12}$ alpha olefins, where the comonomer may be linear or branched, preferably a linear or branched alpha olefin, preferably propylene, butene, pentene, hexene, heptene, octene, nonene, deceone, undecene, dodecene and isomers thereof); with a catalyst system comprising:

1) a Lewis base modifier present at greater than 1:1 (preferably from 1.5:1 to 1000:1, preferably from 2:1 to 500:1, preferably from 3:1 to 100:1, preferably from 4:1 to 20:1, preferably from 5:1 to 10:1) molar ratio of Lewis base modifier to activator, where the Lewis base modifier is represented by the formula:

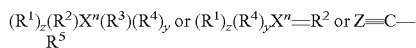

where, z is 0 or 1, y is 0 or 1, n is the valence of X and is 2 or 3, and z+y+2=n, X is a group 15-16 atom excluding oxygen (preferably a N, P, S Lewis base modifier), Z is N or P, $R^1$, $R^2$, $R^3$, $R^4$, and $R^5$ each, independently, are hydrogen, a heteroatom, a substituted heteroatom, or a substituted or unsubstituted alkyl or substituted or unsubstituted aryl, and $R^1$, $R^2$, $R^3$, and $R^4$ may form single or multinuclear rings with each other;

2) an activator (such as an alumoxane or a non-coordinating anion activator); and 3) a metallocene catalyst compound represented by the formula:

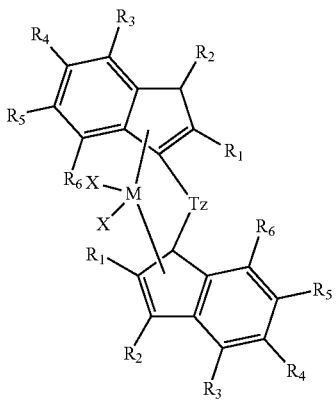

where:
M is a Group transition 4 metal (preferably Hf, Ti, or Zr); z is 1 indicating the presence of a bridging group T, each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system), each $R_1$ is, independently, hydrogen, or a $C_1$ to $C_{10}$ alkyl group, provided that at least one $R_1$ group is H; each $R_2$ is, independently, hydrogen, or a $C_1$ to $C_{10}$ alkyl group; each $R_3$, $R_4$, $R_5$, and $R_6$ is, independently, hydrogen, a substituted hydrocarbyl group, an unsubstituted hydrocarbyl group, or a heteroatom, provided that any of adjacent $R_3$, $R_4$, $R_5$, and $R_6$ groups may form a fused ring or multicenter fused ring system where the rings may be aromatic, partially saturated or saturated.

In a preferred embodiment, increasing the amount of Lewis base in the catalyst system decreases the incorporation of 1-hexene and preferably leads to the appearance of a higher melting point peak.

This invention also relates to a process to alter comonomer distribution (preferably increase blocky character) in a copolymer (as compared to a copolymer made absent the Lewis base modifier under the same polymerization conditions) comprising contacting ethylene and one or more $C_3$ to $C_{40}$ comonomers (preferably $C_3$ to $C_{20}$ alpha olefins, preferably $C_3$ to $C_{12}$ alpha olefins, where the comonomer may be linear or branched, preferably a linear or branched alpha olefin, preferably propylene, butene, pentene, hexene, heptene, octene, nonene, deceone, undecene, dodecene and isomers thereof); with a catalyst system comprising:
1) a Lewis base modifier present at greater than 1:1 (preferably from 1.5:1 to 1000:1, preferably from 2:1 to 500:1, preferably from 3:1 to 100:1, preferably from 4:1 to 20:1, preferably from 5:1 to 10:1) molar ratio of Lewis base modifier to activator, where the Lewis base modifier is represented by the formula:

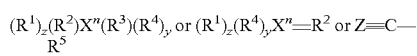

where, z is 0 or 1, y is 0 or 1, n is the valence of X and is 2 or 3, and z+y+2=n, X is a group 15-16 atom excluding oxygen (preferably a N, P, S Lewis base modifier), Z is N or P, $R^1$, $R^2$, $R^3$, $R^4$, and $R^5$ each, independently, are hydrogen, a heteroatom, a substituted heteroatom, or a substituted or unsubstituted alkyl or substituted or unsubstituted aryl, and $R^1$, $R^2$, $R^3$, and $R^4$ may form single or multinuclear rings with each other;
2) an activator (such as an alumoxane or a non-coordinating anion activator); and
3) a metallocene catalyst compound represented by the formula:

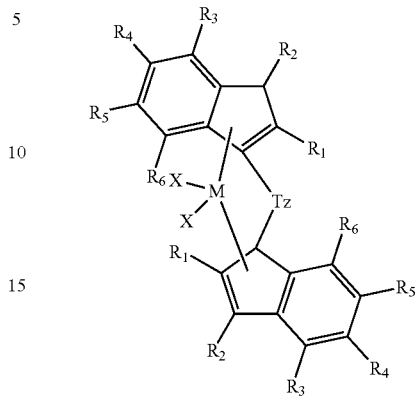

where:
M is a Group transition 4 metal (preferably Hf, Ti, or Zr); z is 1 indicating the presence of a bridging group T, each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system), each $R_1$ is, independently, hydrogen, or a $C_1$ to $C_{10}$ alkyl group, provided that at least one $R_1$ group is H; each $R_2$ is, independently, hydrogen, or a $C_1$ to $C_{10}$ alkyl group; each $R_3$, $R_4$, $R_5$, and $R_6$ is, independently, hydrogen, a substituted hydrocarbyl group, an unsubstituted hydrocarbyl group, or a heteroatom, provided that any of adjacent $R_3$, $R_4$, $R_5$, and $R_6$ groups may form a fused ring or multicenter fused ring system where the rings may be aromatic, partially saturated or saturated;
and thereafter altering the Lewis base present in the reaction zone, introducing a different Lewis base modifier into the reaction zone, and/or altering the amount of Lewis base modifier in the reaction zone, preferably the amount of Lewis base modifier present in the reaction zone is altered by increasing or decreasing the amount of Lewis base modifier in the reaction zone, and/or by introducing a different Lewis base modifier into the reaction zone.

This invention relates to a process for polymerizing olefins in which the amount of Lewis base modifier in a catalyst and or activator solution is adjusted to be from 0.01 mol % to 300 mol % (preferably from 1 mol % to 200 mol %, preferably from 2 mol % to 100 mol %, preferably from 2 mol % to 50 mol %) prior to use in a polymerization zone.

This invention also relates to a method to produce block copolymers comprising adjusting, preferably adjusting on-line, the amount of Lewis base modifier in a polymerization zone, preferably in a continuous process, to obtain block copolymers. Specifically this invention also relates to a process to produce block copolymers comprising contacting ethylene and one or more $C_3$ to $C_{40}$ comonomers (preferably $C_3$ to $C_{20}$ alpha olefins, preferably $C_3$ to $C_{12}$ alpha olefins, where the comonomer may be linear or branched, preferably a linear or branched alpha olefin, preferably propylene, butene, pentene, hexene, heptene, octene, nonene, deceone, undecene, dodecene and isomers thereof); with a catalyst system comprising:
1) a Lewis base modifier present at greater than 1:1 (preferably from 1.5:1 to 1000:1, preferably from 2:1 to 500:1, preferably from 3:1 to 100:1, preferably from 4:1 to 20:1, preferably from 5:1 to 10:1) molar ratio of Lewis base modifier to activator, where the Lewis base modifier is represented by the formula:

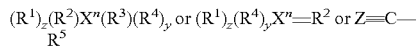

where, z is 0 or 1, y is 0 or 1, n is the valence of X and is 2 or 3, and z+y+2=n, X is a group 15-16 atom excluding oxygen (preferably a N, P, S Lewis base modifier), Z is N or P, $R^1$, $R^2$, $R^3$, $R^4$, and $R^5$ each, independently, are hydrogen, a heteroatom, a substituted heteroatom, or a substituted or unsubstituted alkyl or substituted or unsubstituted aryl, and $R^1$, $R^2$, $R^3$, and $R^4$ may form single or multinuclear rings with each other;
2) an activator (such as an alumoxane or a non-coordinating anion activator); and
3) a metallocene catalyst compound (preferably one metallocene compound) represented by the formula:

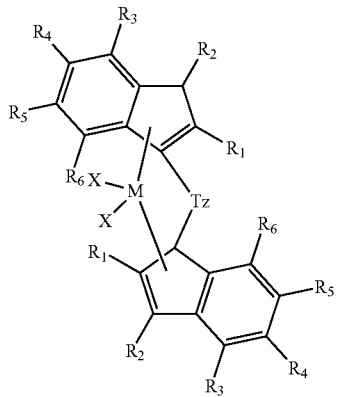

where:
M is a Group transition 4 metal (preferably Hf, Ti, or Zr); z is 1 indicating the presence of a bridging group T, each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system), each $R_1$ is, independently, hydrogen, or a $C_1$ to $C_{10}$ alkyl group, provided that at least one $R_1$ group is H; each $R_2$ is, independently, hydrogen, or a $C_1$ to $C_{10}$ alkyl group; each $R_3$, $R_4$, $R_5$, and $R_6$ is, independently, hydrogen, a substituted hydrocarbyl group, an unsubstituted hydrocarbyl group, or a heteroatom, provided that any of adjacent $R_3$, $R_4$, $R_5$, and $R_6$ groups may form a fused ring or multicenter fused ring system where the rings may be aromatic, partially saturated or saturated;
and, optionally, thereafter altering the Lewis base present in the reaction zone, preferably the amount of Lewis base modifier present in the reaction zone is altered by increasing or decreasing the amount of Lewis base modifier in the reaction zone, and/or by introducing a different Lewis base modifier into the reaction zone.

Block copolymers are defined to be copolymers having a single TREF peak (from analytical TREF) and having a DSC peak melting temperature (Tm) of Y or more, where Y=134−(6.25*X), where X is the mol % comonomer, as determined by $^1$H NMR, alternately Y=135−(6.25*X), alternately Y=136−(6.25*X), alternately Y=137−(6.25*X), alternately Y=132−(5*X), alternately Y=132−(4*X), alternately Y=132−(3*X).

In another preferred embodiment, where one catalyst compound has two or more isomers present, the copolymer produced may have a TREF trace having one or two peaks or one or two inflection points, in addition to having a DSC peak melting temperature (Tm) of Y or more, where Y=134−(6.25*X), where X is the mol % comonomer, as determined by $^1$H NMR, alternately Y=135−(6.25*X), alternately Y=136−(6.25*X), alternately Y=137−(6.25*X), alternately Y=132−(5*X), alternately Y=132−(4*X), alternately Y=132−(3*X).

In a preferred embodiment, the copolymer obtained by the processes described herein has an average ethylene run length of 6 or more (alternately 7 or more, alternately 8 or more, alternately 10 or more, alternately 12 or more).

In a preferred embodiment, the copolymer obtained by the processes described herein has an average ethylene run length of at least 10%, preferably at least 50%, preferably at least 100% greater than the average run length of the copolymer made under the same conditions without the Lewis base modifier present.

Alternately the copolymer obtained by the processes described herein has an $r_1r_2$ of 0.6 or more, preferably 0.8 or more, preferably 1.0 or more, preferably 1.2 or more.

In a preferred embodiment, the copolymer obtained by the processes described herein has an $r_1r_2$ of at least 10%, preferably at least 20%, preferably at least 30%, preferably at least 50%, preferably at least 75%, preferably at least 100% greater than the $r_1r_2$ of the copolymer made under the same conditions without the Lewis base modifier present.

In a preferred embodiment, the copolymer obtained by the processes described herein has a DSC peak melting temperature (Tm) of Y or more, where Y=134−(6.25*X), where X is the mol % comonomer, as determined by $^1$H NMR, alternately Y=135−(6.25*X), alternately Y=136−(6.25*X), alternately Y=137−(6.25*X), alternately Y=132−(5*X), alternately Y=132−(4*X), alternately Y=132−(3*X).

In a preferred embodiment, in any of the processes described herein, one metallocene catalyst compound is used, e.g., the metallocene catalyst compounds are not substantially different, preferably the metallocene catalyst compounds are not different. Generally, metallocene catalyst compounds are not substantially different if they produce the same polymer having the same Mw (GPC), same Mw/Mn (GPC), same mol % comonomer incorporation ($^{13}$C NMR), and same comonomer distribution ([HHH triad] by $^{13}$C NMR) at the same activity (g/mmol/hour), where same means within 5% relative to each other, preferably within 4%, preferably within 3%, preferably within 2%, preferably within 1%. Specifically, however, for purposes of this invention and the claims thereto, one metallocene catalyst compound is considered different from another if they differ by at least one atom, not including the anionic leaving groups (such as the X groups in the metallocene formulae below). For example "bisindenyl zirconium dichloride" is different from "(indenyl)(2-methylindenyl)zirconium dichloride" which is different from "(indenyl)(2-methylindenyl)hafnium dichloride," but "bisindenyl zirconium dichloride" is not different from "bisindenyl zirconium dimethyl." Metallocene catalyst compounds that differ only by isomer are considered not different for purposes if this invention, e.g., rac-dimethylsilylbis(2-methyl 4-phenyl)hafnium dimethyl is considered to be not different from meso-dimethylsilylbis(2-methyl 4-phenyl) hafnium dimethyl. Likewise, for purposes of this invention and the claims thereto, it is recognized that group 4 metals are often difficult to purify; therefore, a metallocene may have 1 wt % or less (preferably 0.1 wt % or less, preferably 0.001 wt % or less) of other group 4 metal(s) analogs and still be considered as "not different." For example, hafnium is known to often have zirconium contaminants; therefore, the presence of bisindenyl zirconium dimethyl at 1 wt % or less in bisindenyl hafnium dimethyl, would be considered "not different."

Lewis Base Modifiers

The process described herein uses a Lewis base modifier in combination with a metallocene catalyst compound and an activator to produce ethylene copolymers.

Useful Lewis base modifiers are any Lewis base compound having a central atom with a free pair of electrons. Preferably the Lewis base modifier is a Group 15-16 Lewis base excluding oxygen, preferably a N, P, or S Lewis base (e.g., a Lewis base comprising nitrogen, phosphorus and/or sulfur). Particularly, preferred Lewis base modifiers include trimethylamine, ethyldimethylamine, diethylmethylamine, triethylamine, tripropylamine (including n-propyl, and isopropyl, and combinations thereof), dimethylpropylamine (including n-propyl, and isopropyl), diethylpropylamine (including n-propyl, and isopropyl), methyldipropylamine (including n-propyl, and isopropyl), ethyldipropylamine (including n-propyl, and isopropyl) tributylamine (including n-butyl, sec-butyl, isobutyl, and tert-butyl), dimethylbutylamine (including n-butyl, sec-butyl, isobutyl, and tert-butyl), dimethylphenylamine, diethylbutylamine (including n-butyl, sec-butyl, isobutyl, and tert-butyl), butyldipropylamine (including n-propyl, isopropyl, n-butyl, sec-butyl, isobutyl, and tert-butyl), dibutylpropylamine (including n-propyl, isopropyl, n-butyl, sec-butyl, isobutyl, and tert-butyl), methyldiphenylamine, triphenylamine, quinuclidine, 1,4-diazabicyclo[2.2.2]octane, pyridine, 4-(dimethylamino)pyridine, quinoline, isoquinoline, 1,2,3,4-tetrahydroquinoline, acridine, and mixtures thereof.

In some embodiments, two, three, four, or more Lewis base modifiers are used in combination with the metallocene and activator.

In a preferred embodiment, the Lewis base modifier is represented by the formula:

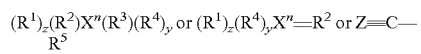

where, z is 0 or 1, y is 0 or 1, n is the valence of X and is 2 or 3, and z+y+2=n, X is a group 15-16 atom excluding oxygen (preferably N, S, P, preferably N or P, preferably N), Z is N or P (preferably N), $R^1$, $R^2$, $R^3$, $R^4$, and $R^5$ each, independently, are hydrogen, a heteroatom, a substituted heteroatom, or a substituted or unsubstituted alkyl or substituted or unsubstituted aryl (preferably $C_1$ to $C_{30}$ substituted or unsubstituted alkyl or substituted or unsubstituted aryl, preferably $C_1$ to $C_{12}$, preferably methyl, ethyl propyl, butyl, pentyl, hexyl, heptyl, octyl, nonyl, decyl, undecyl, dodecyl phenyl, substituted phenyl (such as tolyl), and isomers thereof, and $R^1$, $R^2$, $R^3$, and $R^4$ may form single or multinuclear rings with each other (for example, $R^1$ and $R^2$ can form a ring, $R^1$ and $R^4$ can form a ring, $R^2$ and $R^3$ can form a ring, $R^3$ and $R^4$ can form a ring, $R^1$, $R^2$, and $R^3$ can form a ring, $R^1$, $R^2$, $R^3$, and $R^4$ can form a multi-ring system, and the like).

In a preferred embodiment, the Lewis base modifier is represented by the formula:

$$(R^1)_z(R^2)X^n(R^3)$$

where, z is 0, 1, or 2, n is the valence of X and is 2 or 3, X is N, S, or P, $R^1$, $R^2$, and $R^3$ each, independently, are hydrogen, a heteroatom, a substituted heteroatom, or a substituted or unsubstituted alkyl or substituted or unsubstituted aryl (preferably $C_1$ to $C_{30}$ substituted or unsubstituted alkyl or substituted or unsubstituted aryl, preferably $C_1$ to $C_{12}$, preferably methyl, ethyl propyl, butyl, pentyl, hexyl, heptyl, octyl, nonyl, decyl, undecyl, dodecyl, phenyl, substituted phenyl (such as tolyl), and isomers thereof, and $R^1$, $R^2$, and $R^3$ may form single or multinuclear rings with each other (for example, $R^1$ and $R^2$ can form a ring, $R^2$ and $R^3$ can form a ring, $R^1$, $R^2$, and $R^3$ can form a multi-ring system, and the like).

In a preferred embodiment, the Lewis base modifier is represented by the formula:

$$(R^1)_z(R^4)_y X^n = R^2$$

where, z is 0 or 1, y is 0 or 1, n is the valence of X and is 2 or 3, and z+y+2=n, X is N, S, or P, $R^1$, $R^2$, and $R^4$ each, independently, are hydrogen, a heteroatom, a substituted heteroatom, or a substituted or unsubstituted alkyl or substituted or unsubstituted aryl (preferably $C_1$ to $C_{30}$ substituted or unsubstituted alkyl or substituted or unsubstituted aryl, preferably $C_1$ to $C_{12}$, preferably methyl, ethyl propyl, butyl, pentyl, hexyl, heptyl, octyl, nonyl, decyl, undecyl, dodecyl, phenyl, substituted phenyl (such as tolyl), and isomers thereof, and $R^1$, $R^2$, $R^3$, and $R^4$ may form single or multinuclear rings with each other (for example, $R^1$ and $R^2$ can form a ring, $R^1$ and $R^4$ can form a ring, $R^2$ and $R^4$ can form a multi-ring system and the like).

In a particularly preferred embodiment, the Lewis base modifier is represented by the formula:

$$(R^1)(R^4)N = R^2$$

where, $R^1$, $R^2$, and $R^4$ each, independently, are hydrogen, a heteroatom, a substituted heteroatom, or a substituted or unsubstituted alkyl or substituted or unsubstituted aryl (preferably $C_1$ to $C_{30}$ substituted or unsubstituted alkyl or substituted or unsubstituted aryl, preferably $C_1$ to $C_{12}$, preferably methyl, ethyl propyl, butyl, pentyl, hexyl, heptyl, octyl, nonyl, decyl, undecyl, dodecyl, phenyl, substituted phenyl (such as tolyl), and isomers thereof, and $R^1$, $R^2$, $R^3$, and $R^4$ may form single or multinuclear rings with each other (for example, $R^1$ and $R^2$ can form a ring, $R^1$ and $R^4$ can form a ring, $R^2$ and $R^4$ can form a multi-ring system, and the like).

In a particularly preferred embodiment, the Lewis base modifier is represented by the formula: $N = C - R^5$, where $R^5$ is hydrogen, a heteroatom, a substituted heteroatom, or a substituted or unsubstituted alkyl or substituted or unsubstituted aryl (preferably $C_1$ to $C_{30}$ substituted or unsubstituted alkyl or substituted or unsubstituted aryl, preferably $C_1$ to $C_{12}$, preferably methyl, ethyl propyl, butyl, pentyl, hexyl, heptyl, octyl, nonyl, decyl, undecyl, dodecyl, phenyl, substituted phenyl (such as tolyl), and isomers thereof).

The modifier may be mixed with the metallocene and/or activator before or after entry into the polymerization reactor. In a preferred embodiment, the Lewis base modifier contacts the metallocene prior to the metallocene contacting olefin monomers. In an alternate embodiment, a Lewis base modifier contacts the metallocene after the metallocene has contacted olefin monomers, such as for example in a system where a different Lewis base modifier is added to a second reactor in series.

In a preferred embodiment, the Lewis base modifier is a strong nucleophile. By strong nucleophile is meant having an N''' from 1 to 6, preferably 2 to 6, preferably 3 to 6 as defined in Bently, *Nucleophilicity parameters for strong nucleophiles in dimethyl sulfoxide. A direct alternative to the s(E+N) equation*, Journal of Physical Organic Chemistry, Volume 24, Issue 4, pages 282-291, April 2011.

In a preferred embodiment, the Lewis base modifier is present at a molar ratio of Lewis base modifier to catalyst compound of greater than 0.1:1, preferably from 0.5:1 to 1000:1, preferably from 0.5:1 to 500:1, preferably from 1:1 to 300:1, preferably from 2:1 to 100:1, preferably from 2:1 to 50:1, preferably from 2:1 to 25:1, preferably from 2:1 to 20:1, preferably from 2:1 to 15:1, preferably from 2:1 to 10:1.

In a preferred embodiment, the Lewis base modifier is present at a molar ratio of X in the Lewis base modifier (as described in the formulae above) to transition metal in the catalyst compound of greater than 0.1:1, preferably from 0.5:1 to 1000:1, preferably from 0.5:1 to 500:1, preferably from 1:1 to 300:1, preferably from 2:1 to 100:1, preferably from 2:1 to 50:1, preferably from 2:1 to 25:1, preferably from 2:1 to 20:1, preferably from 2:1 to 15:1, preferably from 2:1 to 10:1.

In a preferred embodiment, the Lewis base modifier is present at a molar ratio of X in the Lewis base modifier (as described in the formulae above) to group 13 metal in the activator compound of greater than 1:1, preferably from 1.5:1 to 1000:1, preferably from 2:1 to 500:1, preferably from 2.25:1 to 300:1, preferably from 3:1 to 100:1, preferably from 3.5:1 to 50:1, preferably from 4:1 to 40:1, preferably from 4:1 to 25:1, preferably from 5:1 to 20:1, preferably from 5:1 to 15:1, preferably from 5:1 to 10:1.

Metallocene Catalyst Systems

A "catalyst system" is a combination of at least one catalyst compound, at least one activator, at least one Lewis base modifier, an optional co-activator, and an optional support material. For the purposes of this invention and the claims thereto, when catalyst systems are described as comprising neutral stable forms of the components, it is well understood by one of ordinary skill in the art, that the ionic form of the component is the form that reacts with the monomers to produce polymers.

In the description herein, the metallocene catalyst may be described as a catalyst precursor, a pre-catalyst compound, or a transition metal compound, and these terms are used interchangeably. A polymerization catalyst system is a catalyst system that can polymerize monomers to polymer. An "anionic ligand" is a negatively charged ligand which donates one or more pairs of electrons to a metal ion. A "neutral donor ligand" is a neutrally charged ligand which donates one or more pairs of electrons to a metal ion.

A metallocene catalyst is defined as an organometallic compound with at least one π-bound cyclopentadienyl moiety (or substituted cyclopentadienyl moiety) and more frequently two π-bound cyclopentadienyl moieties or substituted cyclopentadienyl moieties.

For purposes of this invention and claims thereto in relation to metallocene catalyst compounds, the term "substituted" means that a hydrogen group has been replaced with a hydrocarbyl group, a heteroatom, or a heteroatom containing group. For example, methyl cyclopentadiene (Cp) is a Cp group substituted with a methyl group, ethyl alcohol is an ethyl group substituted with an —OH group, and a "substituted hydrocarbyl" is a radical made of carbon and hydrogen where at least one hydrogen is replaced by a heteroatom or heteroatom containing group.

For purposes of this invention and claims thereto, "alkoxides" include those where the alkyl group is a $C_1$ to $C_{10}$ hydrocarbyl. The alkyl group may be straight chain, branched, or cyclic. The alkyl group may be saturated or unsaturated. In some embodiments, the alkyl group may comprise at least one aromatic group.

The metallocene compound useful in the invention herein is represented by the formula:

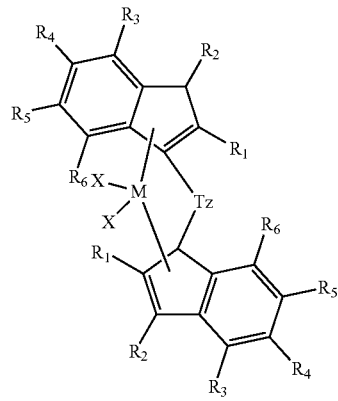

where:
M is a Group transition 4 metal (preferably Hf Ti and/or Zr, preferably Hf or Zr); z is 1 indicating the presence of a bridging group T, each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system), each $R_1$ is, independently, hydrogen, or a $C_1$ to $C_{10}$ alkyl group, provided that at least one $R_1$ group is H; each $R_2$ is, independently, hydrogen, or a $C_1$ to $C_{10}$ alkyl group; each $R_3$, $R_4$, $R_5$, and $R_6$ is, independently, hydrogen, a substituted hydrocarbyl group, an unsubstituted hydrocarbyl group, or a heteroatom, provided that any of adjacent $R_3$, $R_4$, $R_5$, and $R_6$ groups may form a fused ring or multicenter fused ring system where the rings may be aromatic, partially saturated or saturated.

In a preferred embodiment, each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system), preferably each X is independently selected from halides and $C_1$ to $C_5$ alkyl groups, preferably each X is a methyl group;

In a preferred embodiment, each $R_1$ is, independently, hydrogen, or a $C_1$ to $C_{10}$ alkyl group, preferably hydrogen, methyl, ethyl, propyl, butyl, pentyl, hexyl, or isomers thereof, preferably $R_1$ is a methyl group, provided that at least one $R_1$ must be H, preferably both $R_1$ groups are H.

In a preferred embodiment, each $R_2$ is, independently, hydrogen, or a $C_1$ to $C_{10}$ alkyl group, preferably $R_2$ is hydrogen, methyl, ethyl, propyl, butyl, pentyl, hexyl, or an isomer thereof.

In a preferred embodiment, each $R_3$, $R_4$, $R_5$, and $R_6$ is, independently, hydrogen or a substituted hydrocarbyl group or unsubstituted hydrocarbyl group, or a heteroatom, preferably hydrogen, methyl, ethyl, propyl, butyl, pentyl, hexyl, or an isomer thereof, preferably each $R_3$, $R_4$, $R_5$, and $R_6$ is hydrogen.

In a particularly preferred embodiment, all $R_1$ and $R_2$ groups are hydrogen.

In a preferred embodiment, T is a bridging group and comprises Si, Ge, or C, preferably T is dialkyl silicon or dialkyl germanium, preferably T is dimethyl silicon.

Examples of bridging group T useful herein may be represented by $R'_2C$, $R'_2Si$, $R'_2Ge$, $R'_2CCR'_2$, $R'_2CCR'_2CR'_2$, $R'_2CCR'_2CR'_2CR'_2$, $R'C=CR'$, $R'C=CR'CR'_2$, $R'_2CCR'=CR'CR'_2$, $R'C=CR'CR'=CR'$, R'C=CR'CR'$_2$CR'$_2$, R'$_2$CSiR'$_2$, R'$_2$SiSiR'$_2$, R$_2$CSiR'$_2$CR'$_2$, R'$_2$SiCR'$_2$SiR'$_2$, R'C=CR'SiR'$_2$, R'$_2$CGeR'$_2$, R'$_2$GeGeR'$_2$, R'$_2$CGeR'$_2$CR'$_2$, R'$_2$GeCR'$_2$GeR'$_2$, R'$_2$SiGeR'$_2$, R'C=CR'GeR'$_2$, R'B, R'$_2$C—BR', R'$_2$C—BR'—CR'$_2$, R'$_2$C—O—CR'$_2$, R'$_2$CR'$_2$C—O—CR'$_2$CR'$_2$, R'$_2$C—O—CR'$_2$CR'$_2$, R'$_2$C—O—CR'=CR', R'$_2$C—S—CR'$_2$, R'$_2$CR'$_2$C—S—CR'$_2$CR'$_2$, R'$_2$C—S—CR'$_2$CR'$_2$, R'$_2$C—S—CR'=CR', R'$_2$C—Se—CR'$_2$, R'$_2$CR'$_2$C—Se—CR'$_2$CR'$_2$, R'$_2$C—Se—CR$_2$CR'$_2$, R'$_2$C—Se—CR'=CR', R'$_2$C—N=CR', R'$_2$C—NR'—CR'$_2$, R'$_2$C—NR'—CR'$_2$CR'$_2$, R'$_2$C—NR'—CR'=CR', R'$_2$CR'$_2$C—NR'—CR'$_2$CR'$_2$, R'$_2$C—P=CR', and R'$_2$C—PR'—CR'$_2$ where R' is hydrogen or a $C_1$ to $C_{20}$ containing hydrocarbyl, substituted hydrocarbyl, halocarbyl, substituted halocarbyl, silylcarbyl or germylcarbyl substituent and optionally two or more adjacent R' may join to form a substituted or unsubstituted, saturated, partially unsaturated or aromatic, cyclic or polycyclic substituent. Preferably, T is a bridging group comprising carbon or silica, such as dialkylsilyl, preferably T is selected from $CH_2$, $CH_2CH_2$, $C(CH_3)_2$, $SiMe_2$, $SiPh_2$, $SiMePh$, silylcyclobutyl ($Si(CH_2)_3$), $(Ph)_2C$, $(p-(Et)_3SiPh)_2C$, and silylcyclopentyl ($Si(CH_2)_4$).

Preferably T is represented by the formula $R_2^aJ$, where J is C, Si, or Ge, and each $R^a$ is, independently, hydrogen, halogen, $C_1$ to $C_{20}$ hydrocarbyl or a $C_1$ to $C_{20}$ substituted hydrocarbyl, and two $R^a$ can form a cyclic structure including aromatic, partially saturated, or saturated cyclic or fused ring system.

Metallocene compounds that are particularly useful in this invention include one or more of: dimethylsilylbisindenyl hafnium dimethyl, dimethylsilylbisindenyl hafnium dichloride, dimethylsilylbisindenyl zirconium dimethyl, dimethylsilylbisindenyl zirconium dichloride, dimethylsilylbis(4,7-dimethylindenyl)hafnium dimethyl, dimethylsilylbis(4,7-dimethylindenyl)hafnium dichloride, dimethylsilylbis(4,7-dimethylindenyl), zirconium dimethyl, dimethylsilylbis(4,7-dimethylindenyl)zirconium dichloride, dimethylsilylbis(5,6-dimethylindenyl)hafnium dimethyl, dimethylsilylbis(5,6-dimethylindenyl)hafnium dichloride, dimethylsilylbis(5,6-dimethylindenyl), zirconium dimethyl, dimethylsilylbis(5,6-dimethylindenyl)zirconium dichloride, ethylenebisindenyl hafnium dimethyl, ethylenebisindenyl hafnium dichloride, ethylenebisindenyl zirconium dimethyl, ethylenebisindenyl zirconium dichloride, diphenylmethylenebisindenyl hafnium dimethyl, diphenylmethylenebisindenyl hafnium dichloride, diphenylmethylenebisindenyl zirconium dimethyl, and diphenylmethylenebisindenyl zirconium dichloride.

In a particularly preferred embodiment, all $R_1$ and $R_2$ groups in the metallocene formulae above are hydrogen, preferably all $R_1$, $R_2$, and $R_3$ groups in the metallocene formulae above are hydrogen.

In an alternate embodiment, all $R_1$ groups in the metallocene formulae above are hydrogen, and the $R_2$ and $R_3$ groups are H or a $C_1$ to $C_6$ alkyl or aryl, preferably H or methyl.

In an alternate embodiment, all $R_1$, $R_2$, and $R_3$ groups in the metallocene formulae above are hydrogen, and the $R_4$, $R_5$, and $R_6$ groups are H or a $C_1$ to $C_6$ alkyl or aryl, preferably H, phenyl, methyl, ethyl, propyl butyl, pentyl, or hexyl.

In some embodiments, two or more different metallocene catalyst compounds are present in the catalyst system used herein. In some embodiments, two or more different metallocene catalyst compounds are present in the reaction zone where the process(es) described herein occur.

In a preferred embodiment, no more than one metallocene catalyst compound is present in the catalyst system used herein. In some embodiments, no more than one metallocene catalyst compounds are present in the reaction zone where the process(es) described herein occur.

Activators

The terms "cocatalyst" and "activator" are used herein interchangeably and are defined to be any compound which can activate any one of the catalyst compounds described above by converting the neutral catalyst compound to a catalytically active catalyst compound cation. Non-limiting activators, for example, include alumoxanes, aluminum alkyls, ionizing activators, which may be neutral or ionic, and conventional-type cocatalysts. Preferred activators typically include alumoxane compounds, modified alumoxane compounds, and ionizing anion precursor compounds that abstract a reactive, σ-bound, metal ligand making the metal complex cationic and providing a charge-balancing noncoordinating or weakly coordinating anion.

In one embodiment, alumoxane activators are utilized as an activator in the catalyst composition. Alumoxanes are generally oligomeric compounds containing —Al($R^1$)—O— subunits, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide, or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under U.S. Pat. No. 5,041,584).

When the activator is an alumoxane (modified or unmodified), some embodiments select the maximum amount of activator at a 5000-fold molar excess Al/M over the catalyst compound (per metal catalytic site). The minimum activator-to-catalyst-compound is a 1:1 molar ratio. Alternate preferred ranges include from 1:1 to 500:1, alternately from 1:1 to 200:1, alternately from 1:1 to 100:1, or alternately from 1:1 to 50:1.

In an alternate embodiment, little or no alumoxane is used in the polymerization processes described herein. Preferably, alumoxane is present at zero mol %, alternately the alumoxane is present at a molar ratio of aluminum to catalyst compound transition metal less than 500:1, preferably less than 300:1, preferably less than 100:1, preferably less than 1:1.

In a preferred embodiment, the Lewis base modifier is present at a molar ratio of X in the Lewis base modifier (as described in the formulae above) to aluminum metal in the alumoxane compound (preferably methylalumoxane) of greater than 1:1, preferably from 1.5:1 to 1000:1, preferably from 2:1 to 500:1, preferably from 2.25:1 to 300:1, preferably from 3:1 to 100:1, preferably from 3.5:1 to 50:1, preferably from 4:1 to 40:1, preferably from 4:1 to 25:1, preferably from 5:1 to 20:1, preferably from 5:1 to 15:1, preferably from 5:1 to 10:1. (For purposes of calculating the moles of an alkylalumoxane, the alkylalumoxane shall be defined to have an Mw of 43.02 g/mol plus the Mw of the alkyl. For example, methylalumoxane has an Mw of 58.06 g/mol (43.02 g/mol+ 15.04 g/mol) and ethylalumoxane has an Mw of 72.08 g/mol (43.02+29.06 g/mol) and so on).

The term "non-coordinating anion" (NCA) means an anion which either does not coordinate to a cation or which is only weakly coordinated to a cation thereby remaining sufficiently labile to be displaced by a neutral Lewis base. "Compatible"

non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with this invention are those that are compatible, stabilize the transition metal cation in the sense of balancing its ionic charge at +1, and yet retain sufficient lability to permit displacement during polymerization.

It is within the scope of this invention to use an ionizing or stoichiometric activator, neutral or ionic, such as tri(n-butyl) ammonium tetrakis(pentafluorophenyl)borate, a tris perfluorophenyl boron metalloid precursor or a tris perfluoronaphthyl boron metalloid precursor, polyhalogenated heteroborane anions (WO 98/43983), boric acid (U.S. Pat. No. 5,942,459), or combination thereof. It is also within the scope of this invention to use neutral or ionic activators alone or in combination with alumoxane or modified alumoxane activators.

Examples of neutral stoichiometric activators include tri-substituted boron, tellurium, aluminum, gallium, and indium, or mixtures thereof. The three substituent groups are each independently selected from alkyls, alkenyls, halogens, substituted alkyls, aryls, arylhalides, alkoxy, and halides. Preferably, the three groups are independently selected from halogen, mono or multicyclic (including halosubstituted) aryls, alkyls, and alkenyl compounds, and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). More preferably, the three groups are alkyls having 1 to 4 carbon groups, phenyl, naphthyl, or mixtures thereof. Even more preferably, the three groups are halogenated, preferably fluorinated, aryl groups. A preferred neutral stoichiometric activator is tris perfluorophenyl boron or tris perfluoronaphthyl boron.

Ionic stoichiometric activator compounds may contain an active proton, or some other cation associated with, but not coordinated to, or only loosely coordinated to, the remaining ion of the ionizing compound. Such compounds and the like are described in European publications EP 0 570 982 A; EP 0 520 732 A; EP 0 495 375 A; EP 0 500 944 B1; EP 0 277 003 A; EP 0 277 004 A; U.S. Pat. Nos. 5,153,157; 5,198,401; 5,066,741; 5,206,197; 5,241,025; 5,384,299; 5,502,124; and U.S. patent application Ser. No. 08/285,380, filed Aug. 3, 1994; all of which are herein fully incorporated by reference.

Preferred compounds useful as an activator in the process of this invention comprise a cation, which is preferably a Bronsted acid capable of donating a proton, and a compatible non-coordinating anion which anion is relatively large (bulky), capable of stabilizing the active catalyst species (the Group 4 cation) which is formed when the two compounds are combined and said anion will be sufficiently labile to be displaced by olefinic, diolefinic and acetylenically unsaturated substrates or other neutral Lewis bases, such as ethers, amines, and the like. Two classes of useful compatible non-coordinating anions have been disclosed in EP 0 277,003 A1, and EP 0 277,004 A1: 1) anionic coordination complexes comprising a plurality of lipophilic radicals covalently coordinated to and shielding a central charge-bearing metal or metalloid core; and 2) anions comprising a plurality of boron atoms such as carboranes, metallacarboranes, and boranes.

In a preferred embodiment, the stoichiometric activators include a cation and an anion component, and are preferably represented by the following formula (II):

$$(Z)_d^{30}(A^{d-}) \quad \text{(II)}$$

wherein Z is (L-H) or a reducible Lewis Acid, L is a neutral Lewis base; H is hydrogen; (L-H)$^+$ is a Bronsted acid; A$^{d-}$ is a non-coordinating anion having the charge d−; and d is an integer from 1 to 3.

When Z is (L-H) such that the cation component is (L-H)$_d^+$, the cation component may include Bronsted acids such as protonated Lewis bases capable of protonating a moiety, such as an alkyl or aryl, from the bulky ligand metallocene containing transition metal catalyst precursor, resulting in a cationic transition metal species. Preferably, the activating cation (L-H)$_d^+$ is a Bronsted acid, capable of donating a proton to the transition metal catalytic precursor resulting in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers, such as dimethyl ether diethyl ether, tetrahydrofuran, and dioxane, sulfoniums from thioethers, such as diethyl thioethers and tetrahydrothiophene, and mixtures thereof.

When Z is a reducible Lewis acid it is preferably represented by the formula: (Ar$_3$C$^+$), where Ar is aryl or aryl substituted with a heteroatom, a C$_1$ to C$_{40}$ hydrocarbyl, or a substituted C$_1$ to C$_{40}$ hydrocarbyl, preferably the reducible Lewis acid is represented by the formula: (Ph$_3$C$^+$), where Ph is phenyl or phenyl substituted with a heteroatom, a C$_1$ to C$_{40}$ hydrocarbyl, or a substituted C$_1$ to C$_{40}$ hydrocarbyl. In a preferred embodiment, the reducible Lewis acid is triphenyl carbenium.

The anion component A$^{d-}$ include those having the formula [M$^{k+}$Q$_n$]$^{d-}$ wherein k is 1, 2, or 3; n is 1, 2, 3, 4, 5, or 6, preferably 3, 4, 5, or 6; n−k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than one occurrence is Q a halide, and two Q groups may form a ring structure. Preferably, each Q is a fluorinated hydrocarbyl group having 1 to 20 carbon atoms, more preferably each Q is a fluorinated aryl group, and most preferably each Q is a pentafluoryl aryl group. Examples of suitable A$^{d-}$ components also include diboron compounds as disclosed in U.S. Pat. No. 5,447,895, which is fully incorporated herein by reference.

In a preferred embodiment, this invention relates to a method to polymerize olefins comprising contacting olefins (preferably ethylene) with an amidinate catalyst compound, a chain transfer agent and a boron containing NCA activator represented by the formula (14):

$$Z_d^+(A^{d-}) \quad \text{(14)}$$

where: Z is (L-H) or a reducible Lewis acid; L is a neutral Lewis base (as further described above); H is hydrogen; (L-H) is a Bronsted acid (as further described above); A$^{d-}$ is a boron containing non-coordinating anion having the charge d$^-$ (as further described above); d is 1, 2, or 3.

In a preferred embodiment in any NCA's represented by Formula 14 described above, the reducible Lewis acid is represented by the formula: (Ar$_3$C$^+$), where Ar is aryl or aryl substituted with a heteroatom, a C$_1$ to C$_{40}$ hydrocarbyl, or a substituted C$_1$ to C$_{40}$ hydrocarbyl, preferably the reducible Lewis acid is represented by the formula: (Ph$_3$C$^+$), where Ph is phenyl or phenyl substituted with a heteroatom, a $C_1$ to $C_{40}$ hydrocarbyl, or a substituted $C_1$ to $C_{40}$ hydrocarbyl.

In a preferred embodiment in any of the NCA's represented by Formula 14 described above, $Z_d^+$ is represented by the formula: $(L-H)_d^+$, wherein L is a neutral Lewis base; H is hydrogen; (L-H) is a Bronsted acid; and d is 1, 2, or 3, preferably $(L-H)_d^+$ is a Bronsted acid selected from ammoniums, oxoniums, phosphoniums, silyliums, and mixtures thereof.

In a preferred embodiment in any of the NCA's represented by Formula 14 described above, the anion component $A^{d-}$ is represented by the formula $[M^{*k*}+Q^*_n*]^{d*}$— wherein $k^*$ is 1, 2, or 3; $n^*$ is 1, 2, 3, 4, 5, or 6 (preferably 1, 2, 3, or 4); $n^*-k^*=d^*$; $M^*$ is boron; and $Q^*$ is independently selected from hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said $Q^*$ having up to 20 carbon atoms with the proviso that in not more than 1 occurrence is $Q^*$ a halide.

This invention also relates to a method to polymerize olefins comprising contacting olefins (such as ethylene) with an amidinate catalyst compound, a chain transfer agent and an NCA activator represented by the formula (I):

where R is a monoanionic ligand; $M^{**}$ is a Group 13 metal or metalloid; ArNHal is a halogenated, nitrogen-containing aromatic ring, polycyclic aromatic ring, or aromatic ring assembly in which two or more rings (or fused ring systems) are joined directly to one another or together; and n is 0, 1, 2, or 3. Typically the NCA comprising an anion of Formula I also comprises a suitable cation that is essentially non-interfering with the ionic catalyst complexes formed with the transition metal compounds, preferably the cation is $Z_d^1$ as described above.

In a preferred embodiment in any of the NCA's comprising an anion represented by Formula I described above, R is selected from the group consisting of substituted or unsubstituted $C_1$ to $C_{30}$ hydrocarbyl aliphatic or aromatic groups, where substituted means that at least one hydrogen on a carbon atom is replaced with a hydrocarbyl, halide, halocarbyl, hydrocarbyl or halocarbyl substituted organometalloid, dialkylamido, alkoxy, aryloxy, alkysulfido, arylsulfido, alkylphosphido, arylphosphide, or other anionic substituent; fluoride; bulky alkoxides, where bulky means $C_4$ to $C_{20}$ hydrocarbyl groups; $-SR^1$, $-NR^2_2$, and $-PR^3_2$, where each $R^1$, $R^2$, or $R^3$ is independently a substituted or unsubstituted hydrocarbyl as defined above; or a $C_1$ to $C_{30}$ hydrocarbyl substituted organometalloid.

In a preferred embodiment in any of the NCA's comprising an anion represented by Formula I described above, the NCA also comprises cation comprising a reducible Lewis acid represented by the formula: $(Ar_3C^+)$, where Ar is aryl or aryl substituted with a heteroatom, a $C_1$ to $C_{40}$ hydrocarbyl, or a substituted $C_1$ to $C_{40}$ hydrocarbyl, preferably the reducible Lewis acid represented by the formula: $(Ph_3C^+)$, where Ph is phenyl or phenyl substituted with a heteroatom, a $C_1$ to $C_{40}$ hydrocarbyl, or a substituted $C_1$ to $C_{40}$ hydrocarbyl.

In a preferred embodiment in any of the NCA's comprising an anion represented by Formula I described above, the NCA also comprises a cation represented by the formula, $(L-H)_d^+$, wherein L is a neutral Lewis base; H is hydrogen; (L-H) is a Bronsted acid; and d is 1, 2, or 3, preferably $(L-H)_d^+$ is a Bronsted acid selected from ammoniums, oxoniums, phosphoniums, silyliums, and mixtures thereof.

Further examples of useful activators include those disclosed in U.S. Pat. Nos. 7,297,653 and 7,799,879.

Another activator useful herein comprises a salt of a cationic oxidizing agent and a noncoordinating, compatible anion represented by the formula (16):

wherein $OX^{e+}$ is a cationic oxidizing agent having a charge of e+; e is 1, 2, or 3; d is 1, 2, or 3; and $A^{d-}$ is a non-coordinating anion having the charge of d- (as further described above). Examples of cationic oxidizing agents include: ferrocenium, hydrocarbyl-substituted ferrocenium, $Ag^+$, or $Pb^{+2}$. Preferred embodiments of $A^{d-}$ include tetrakis(pentafluorophenyl)borate.

In another embodiment, the amidinate catalyst compounds and CTA's described herein can be used with Bulky activators. A "Bulky activator" as used herein refers to anionic activators represented by the formula:

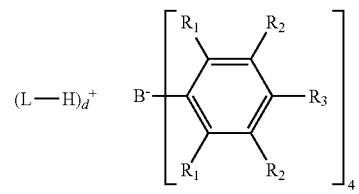

where:
each $R_1$ is, independently, a halide, preferably a fluoride;
each $R_2$ is, independently, a halide, a $C_6$ to $C_{20}$ substituted aromatic hydrocarbyl group or a siloxy group of the formula $-O-Si-R_a$, where $R_a$ is a $C_1$ to $C_{20}$ hydrocarbyl or hydrocarbylsilyl group (preferably $R_2$ is a fluoride or a perfluorinated phenyl group);
each $R_3$ is a halide, $C_6$ to $C_{20}$ substituted aromatic hydrocarbyl group or a siloxy group of the formula $-O-Si-R_a$, where $R_a$ is a $C_1$ to $C_{20}$ hydrocarbyl or hydrocarbylsilyl group (preferably $R_3$ is a fluoride or a $C_6$ perfluorinated aromatic hydrocarbyl group); wherein $R_2$ and $R_3$ can form one or more saturated or unsaturated, substituted or unsubstituted rings (preferably $R_2$ and $R_3$ form a perfluorinated phenyl ring);
L is a neutral Lewis base; $(L-H)^+$ is a Bronsted acid; d is 1, 2, or 3;
wherein the anion has a molecular weight of greater than 1020 g/mol; and
wherein at least three of the substituents on the B atom each have a molecular volume of greater than 250 cubic Å, alternately greater than 300 cubic Å, or alternately greater than 500 cubic Å.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple 'Back of the Envelope' Method for Estimating the Densities and Molecular Volumes of Liquids and Solids," Journal of Chemical Education, Vol. 71, No. 11, November 1994, pp. 962-964. Molecular volume (MV), in units of cubic Å, is calculated using the formula: $MV=8.3V_s$, where $V_s$ is the scaled volume. $V_s$ is the sum of the relative volumes of the constituent atoms, and is calculated from the molecular formula of the substituent using the following table of relative volumes. For fused rings, the $V_s$ is decreased by 7.5% per fused ring.

| Element | Relative Volume |
| --- | --- |
| H | 1 |
| 1st short period, Li to F | 2 |
| 2nd short period, Na to Cl | 4 |
| 1st long period, K to Br | 5 |
| 2nd long period, Rb to I | 7.5 |
| 3rd long period, Cs to Bi | 9 |

Exemplary bulky substituents of activators suitable herein and their respective scaled volumes and molecular volumes are shown in the table below. The dashed bonds indicate binding to boron, as in the general formula above.

| Activator | Structure of boron substituents | Molecular Formula of each substituent | $V_s$ | MV Per subst. (Å³) | Total MV (Å³) |
| --- | --- | --- | --- | --- | --- |
| Dimethylanilinium tetrakis(perfluoronaphthyl)borate | [perfluoronaphthyl structure]₄ | $C_{10}F_7$ | 34 | 261 | 1044 |
| Dimethylanilinium tetrakis(perfluorobiphenyl)borate | [perfluorobiphenyl structure]₄ | $C_{12}F_9$ | 42 | 349 | 1396 |
| [4-tButyl-PhNMe₂H][(C₆F₃(C₆F₅)₂)₄B] | [perfluoroterphenyl structure]₄ | $C_{18}F_{13}$ | 62 | 515 | 2060 |

Exemplary bulky activators useful in catalyst systems herein include: trimethylammonium tetrakis(perfluoronaphthyl)borate; triethylammonium tetrakis(perfluoronaphthyl)borate; tripropylammonium tetrakis(perfluoronaphthyl)borate; tri(n-butyl)ammonium tetrakis(perfluoronaphthyl)borate; tri(t-butyl)ammonium tetrakis(perfluoronaphthyl)borate; N,N-dimethylanilinium tetrakis(perfluoronaphthyl)borate; N,N-diethylanilinium tetrakis(perfluoronaphthyl)borate; N,N-dimethyl-(2,4,6-trimethylanilinium)tetrakis(perfluoronaphthyl)borate; tropillium tetrakis(perfluoronaphthyl)borate; triphenylcarbenium tetrakis(perfluoronaphthyl)borate; triphenylphosphonium tetrakis(perfluoronaphthyl)borate; triethylsilylium tetrakis(perfluoronaphthyl)borate; benzene(diazonium)tetrakis(perfluoronaphthyl)borate; trimethylammonium tetrakis(perfluorobiphenyl)borate; triethylammonium tetrakis(perfluorobiphenyl)borate; tripropylammonium tetrakis(perfluorobiphenyl)borate; tri(n-butyl)ammonium tetrakis(perfluorobiphenyl)borate; tri(t-butyl)ammonium tetrakis(perfluorobiphenyl)borate; N,N-dimethylanilinium tetrakis(perfluorobiphenyl)borate; N,N-diethylanilinium tetrakis(perfluorobiphenyl)borate; N,N-dimethyl-(2,4,6-trimethylanilinium)tetrakis(perfluorobiphenyl)borate; tropillium tetrakis(perfluorobiphenyl)borate; triphenylcarbenium tetrakis(perfluorobiphenyl)borate; triphenylphosphonium tetrakis(perfluorobiphenyl)borate; triethylsilylium tetrakis(perfluorobiphenyl)borate; benzene(diazonium)tetrakis(perfluorobiphenyl)borate; [4-t-butyl-PhNMe₂H][(C₆F₃(C₆F₅)₂)₄B]; and the types disclosed in U.S. Pat. No. 7,297,653.

Illustrative, but not limiting, examples of boron compounds which may be used as an activator in the processes of this invention are: trimethylammonium tetraphenylborate; triethylammonium tetraphenylborate; tripropylammonium tetraphenylborate; tri(n-butyl)ammonium tetraphenylborate; tri(t-butyl)ammonium tetraphenylborate; N,N-dimethylanilinium tetraphenylborate; N,N-diethylanilinium tetraphenylborate; N,N-dimethyl-(2,4,6-trimethylanilinium)tetraphenylborate; tropillium tetraphenylborate; triphenylcarbenium tetraphenylborate; triphenylphosphonium tetraphenylborate triethylsilylium tetraphenylborate; benzene(diazonium)tetraphenylborate; trimethylammonium tetrakis(pentafluorophenyl)borate; triethylammonium tetrakis(pentafluorophenyl)borate; tripropylammonium tetrakis(pentafluorophenyl)borate; tri(n-butyl)ammonium tetrakis(pentafluorophenyl)borate; tri(sec-butyl)ammonium tetrakis(pentafluorophenyl)borate; N,N-dimethylanilinium tetrakis(pentafluorophenyl)borate; N,N-diethylanilinium tetrakis(pentafluorophenyl)borate; N,N-dimethyl-(2,4,6-trimethylanilinium)tetrakis(pentafluorophenyl)borate; tropillium tetrakis(pentafluorophenyl)borate; triphenylcarbenium tetrakis(pentafluorophenyl)borate; triphenylphosphonium tetrakis(pentafluorophenyl)borate; triethylsilylium tetrakis(pentafluorophenyl)borate; benzene(diazonium)tetrakis(pentafluorophenyl)borate; trimethylammonium tetrakis-(2,3,4,6-tetrafluorophenyl)borate; triethylammonium tetrakis-(2,3,4,6-tetrafluorophenyl)borate; tripropylammonium tetrakis-(2,3,4,6-tetrafluorophenyl)borate; tri(n-butyl)ammonium tetrakis-(2,3,4,6-tetrafluoro-phenyl)borate; dimethyl(t-butyl)ammonium tetrakis-(2,3,4,6-tetrafluorophenyl)borate; N,N-dimethylanilinium tetrakis-(2,3,4,6-tetrafluorophenyl)borate; N,N-diethylanilinium tetrakis-(2,3,4,6-tetrafluorophenyl)borate; N,N-dimethyl-(2,4,6-trimethylanilinium)tetrakis-(2,3,4,6-tetrafluorophenyl)borate; tropillium tetrakis-(2,3,4,6-tetrafluorophenyl)borate; triphenylcarbenium tetrakis-(2,3,4,6-tetrafluorophenyl)borate; triphenylphosphonium tetrakis-(2,3,4,6-tetrafluorophenyl)borate; triethylsilylium tetrakis-(2,3,4,6-tetrafluorophenyl)borate; benzene(diazonium)tetrakis-(2,3,4,6-tetrafluorophenyl)borate; trimethylammonium tetrakis(perfluoronaphthyl)borate; triethylammonium tetrakis(perfluoronaphthyl)borate; tripropylammonium tetrakis(perfluoronaphthyl)borate; tri(n-butyl)ammonium tetrakis(perfluoronaphthyl)borate; tri(t-butyl)ammonium tetrakis(perfluoronaphthyl)borate; N,N-dimethylanilinium tetrakis(perfluoronaphthyl)borate; N,N-diethylanilinium tetrakis(perfluoronaphthyl)borate; N,N-dimethyl-(2,4,6-trimethylanilinium)tetrakis(perfluoronaphthyl)borate; tropillium tetrakis(perfluoronaphthyl)borate; triphenylcarbenium tetrakis(perfluoronaphthyl)borate; triphenylphosphonium tetrakis(perfluoronaphthyl)borate; triethylsilylium tetrakis(perfluoronaphthyl)borate; benzene(diazonium)tetrakis(perfluoronaphthyl)borate; trimethylammonium tetrakis(perfluorobiphenyl)borate; triethylammonium tetrakis(perfluorobiphenyl)borate; tripropylammonium tetrakis(perfluorobiphenyl)borate; tri(n-butyl)ammonium tetrakis(perfluorobiphenyl)borate; tri(t-butyl)ammonium tetrakis(perfluorobiphenyl)borate; N,N-dimethylanilinium tetrakis(perfluorobiphenyl)borate; N,N-diethylanilinium tetrakis(perfluorobiphenyl)borate; N,N-dimethyl-(2,4,6-trimethylanilinium)tetrakis(perfluorobiphenyl)borate; tropillium tetrakis(perfluorobiphenyl)borate; triphenylcarbenium tetrakis(perfluorobiphenyl)borate; triphenylphosphonium tetrakis(perfluorobiphenyl)borate; triethylsilylium tetrakis(perfluorobiphenyl)borate; benzene(diazonium)tetrakis(perfluorobiphenyl)borate; trimethylammonium tetrakis(3,5-bis(trifluoromethyl)phenyl)borate; triethylammonium tetrakis(3,5-bis(trifluoromethyl)phenyl)borate; tripropylammonium tetrakis(3,5-bis(trifluoromethyl)phenyl)borate; tri(n-butyl)ammonium tetrakis(3,5-bis(trifluoromethyl)phenyl)borate; tri(t-butyl)ammonium tetrakis(3,5-bis(trifluoromethyl)phenyl)borate; N,N-dimethylanilinium tetrakis(3,5-bis(trifluoromethyl)phenyl)borate; N,N-diethylanilinium tetrakis(3,5-bis(trifluoromethyl)phenyl)borate; N,N-dimethyl-(2,4,6-trimethylanilinium)tetrakis(3,5-bis(trifluoromethyl)phenyl)borate; tropillium tetrakis(3,5-bis(trifluoromethyl)phenyl)borate; triphenylcarbenium tetrakis(3,5-bis(trifluoromethyl)phenyl)borate; triphenylphosphonium tetrakis(3,5-bis(trifluoromethyl)phenyl)borate; triethylsilylium tetrakis(3,5-bis(trifluoromethyl)phenyl)borate; benzene(diazonium)tetrakis(3,5-bis(trifluoromethyl)phenyl)borate; and dialkyl ammonium salts, such as: di-(i-propyl)ammonium tetrakis(pentafluorophenyl)borate, and dicyclohexylammonium tetrakis(pentafluorophenyl)borate; and additional tri-substituted phosphonium salts, such as tri(o-tolyl)phosphonium tetrakis(pentafluorophenyl)borate, and tri(2,6-dimethylphenyl)phosphonium tetrakis(pentafluorophenyl)borate.

Preferred activators include N,N-dimethylanilinium tetrakis(perfluoronaphthyl)borate; N,N-dimethylanilinium tetrakis(perfluorobiphenyl)borate; N,N-dimethylanilinium tetrakis(3,5-bis(trifluoromethyl)phenyl)borate; triphenylcarbenium tetrakis(perfluoronaphthyl)borate; triphenylcarbenium tetrakis(perfluorobiphenyl)borate; triphenylcarbenium tetrakis(3,5-bis(trifluoromethyl)phenyl)borate; triphenylcarbenium tetrakis(perfluorophenyl)borate; [Ph$_3$C$^+$][B(C$_6$F$_5$)$_4$$^-$]; [Me$_3$NH$^+$][B(C$_6$F$_5$)$_4$$^-$]; 1-(4-(tris(pentafluorophenyl)borate)-2,3,5,6-tetrafluorophenyl)pyrrolidinium; and tetrakis(pentafluorophenyl)borate, 4-(tris(pentafluorophenyl)borate)-2,3,5,6-tetrafluoropyridine.

In a preferred embodiment, the activator comprises a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate).

In another embodiment, the activator comprises one or more of trialkylammonium tetrakis(pentafluorophenyl)borate; N,N-dialkylanilinium tetrakis(pentafluorophenyl)borate; N,N-dimethyl-(2,4,6-trimethylanilinium)tetrakis(pentafluorophenyl)borate; trialkylammonium tetrakis-(2,3,4,6-tetrafluorophenyl) borate; N,N-dialkylanilinium tetrakis-(2,3,4,6-tetrafluorophenyl)borate; trialkylammonium tetrakis(perfluoronaphthyl)borate; N,N-dialkylanilinium tetrakis(perfluoronaphthyl)borate; trialkylammonium tetrakis(perfluorobiphenyl)borate; N,N-dialkylanilinium tetrakis(perfluorobiphenyl)borate; trialkylammonium tetrakis(3,5-bis(trifluoromethyl)phenyl)borate; N,N-dialkylanilinium tetrakis(3,5-bis(trifluoromethyl)phenyl)borate; N,N-dialkyl-(2,4,6-trimethylanilinium)tetrakis(3,5-bis(trifluoromethyl)phenyl)borate; di-(i-propyl)ammonium tetrakis(pentafluorophenyl)borate; (where alkyl is methyl, ethyl, propyl, n-butyl, sec-butyl, or t-butyl).

In a preferred embodiment, any of the activators described herein may be mixed together before or after combination with the catalyst compound and/or CTA, preferably before being mixed with the catalyst compound and/or CTA.

In some embodiments, two NCA activators may be used in the polymerization and the molar ratio of the first NCA activator to the second NCA activator can be any ratio. In some embodiments, the molar ratio of the first NCA activator to the second NCA activator is 0.01:1 to 10,000:1, preferably 0.1:1 to 1000:1, preferably 1:1 to 100:1.

Further, the typical activator-to-catalyst ratio, e.g., all NCA activators-to-catalyst ratio is a 1:1 molar ratio. Alternate preferred ranges include from 0.1:1 to 100:1, alternately from 0.5:1 to 200:1, alternately from 1:1 to 500:1, alternately from 1:1 to 1000:1. A particularly useful range is from 0.5:1 to 10:1, preferably 1:1 to 5:1.

It is also within the scope of this invention that the catalyst compounds can be combined with combinations of alumoxanes and NCA's (see for example, U.S. Pat. Nos. 5,153,157; 5,453,410; European Patent No. EP 0 573 120 B1; and PCT Publication Nos. WO 94/07928, and WO 95/14044 which discuss the use of an alumoxane in combination with an ionizing activator).

Optional Scavengers

In addition to these activator compounds, scavengers may be used. Aluminum alkyl or organoaluminum compounds which may be utilized as scavengers include, for example, trimethylaluminum, triethylaluminum, triisobutylaluminum, tri-n-hexylaluminum, tri-n-octylaluminum, and diethyl zinc.

Optional Support Materials

In embodiments herein, the catalyst system may comprise an inert support material. Preferably the supported material is a porous support material, for example, talc, and inorganic oxides. Other support materials include zeolites, clays, organoclays, or any other organic or inorganic support material and the like, or mixtures thereof.

Preferably, the support material is an inorganic oxide in a finely divided form. Suitable inorganic oxide materials for use in metallocene catalyst systems herein include Groups 2, 4, 13, and 14 metal oxides, such as silica, alumina, and mixtures thereof. Other inorganic oxides that may be employed either alone or in combination with the silica, or alumina are magnesia, titania, zirconia, and the like. Other suitable support materials, however, can be employed, for example, finely divided functionalized polyolefins, such as finely divided polyethylene. Particularly useful supports include magnesia, titania, zirconia, montmorillonite, phyllosilicate, zeolites, talc, clays, and the like. Also, combinations of these support materials may be used, for example, silica-chromium, silica-alumina, silica-titania, and the like. Preferred support materials include $Al_2O_3$, $ZrO_2$, $SiO_2$, and combinations thereof, more preferably $SiO_2$, $Al_2O_3$, or $SiO_2/Al_2O_3$.

It is preferred that the support material, most preferably an inorganic oxide, has a surface area in the range of from about 10 to about 700 $m^2/g$, pore volume in the range of from about 0.1 to about 4.0 cc/g and average particle size in the range of from about 5 to about 500 µm. More preferably, the surface area of the support material is in the range of from about 50 to about 500 $m^2/g$, pore volume of from about 0.5 to about 3.5 cc/g and average particle size of from about 10 to about 200 µm. Most preferably the surface area of the support material is in the range is from about 100 to about 400 $m^2/g$, pore volume from about 0.8 to about 3.0 cc/g and average particle size is from about 5 to about 100 µm. The average pore size of the support material useful in the invention is in the range of from 10 to 1000 Å, preferably 50 to about 500 Å, and most preferably 75 to about 350 Å. In some embodiments, the support material is a high surface area, amorphous silica (surface area=300 $m^2$/gm; pore volume of 1.65 $cm^3$/gm). Preferred silicas are marketed under the tradenames of DAVISON 952 or DAVISON 955 by the Davison Chemical Division of W.R. Grace and Company. In other embodiments, DAVISON 948 is used.

The support material should be dry, that is, free of absorbed water. Drying of the support material can be effected by heating or calcining at about 100° C. to about 1000° C., preferably at least about 600° C. When the support material is silica, it is heated to at least 200° C., preferably about 200° C. to about 850° C., and most preferably at about 600° C.; and for a time of about 1 minute to about 100 hours, from about 12 hours to about 72 hours, or from about 24 hours to about 60 hours. The calcined support material must have at least some reactive hydroxyl (OH) groups to produce supported catalyst systems of this invention. The calcined support material is then contacted with at least one polymerization catalyst comprising at least one metallocene compound and an activator.

Methods of Making the Supported Catalyst Systems

The support material, having reactive surface groups, typically hydroxyl groups, is slurried in a non-polar solvent and the resulting slurry is contacted with a solution of a metallocene compound, Lewis base modifier, and an activator. In some embodiments, the slurry of the support material is first contacted with the activator and/or Lewis base modifier for a period of time in the range of from about 0.5 hours to about 24 hours, from about 2 hours to about 16 hours, or from about 4 hours to about 8 hours. The solution of the metallocene compound is then contacted with the isolated support/activator and/or Lewis base modifier. In some embodiments, the supported catalyst system is generated in situ.

The mixture of the metallocene, activator, Lewis base modifier and support is heated to about 0° C. to about 70° C., preferably to about 23° C. to about 60° C., preferably at room temperature. Contact times typically range from about 0.5 hours to about 24 hours, from about 2 hours to about 16 hours, or from about 4 hours to about 8 hours.

Suitable non-polar solvents are materials in which all of the reactants used herein, i.e., the activator, and the metallocene compound, are at least partially soluble and which are liquid at reaction temperatures. Preferred non-polar solvents are alkanes, such as isopentane, hexane, n-heptane, octane, nonane, and decane, although a variety of other materials including cycloalkanes, such as cyclohexane, aromatics, such as benzene, toluene, and ethylbenzene, may also be employed.

Polymerization Processes

In embodiments herein, the invention relates to polymerization processes where monomer (such as ethylene), and at least one comonomer, are contacted with a catalyst system comprising an activator, a Lewis base modifier and at least one metallocene compound, as described above. The catalyst compound, activator and Lewis base modifier may be combined in any order, and in some embodiments the three are combined prior to contacting with the monomer. Typically the catalyst compound, activator and Lewis base modifier are combined in a solvent prior to contact with the monomers.

Monomers useful herein include substituted or unsubstituted $C_2$ to $C_{40}$ alpha olefins, preferably $C_2$ to $C_{20}$ alpha olefins, preferably $C_2$ to $C_{12}$ alpha olefins, preferably ethylene, propylene, butene, pentene, hexene, heptene, octene, nonene, decene, undecene, dodecene and isomers thereof. In a preferred embodiment, the monomer comprises ethylene and an optional comonomers comprising one or more $C_3$ to $C_{40}$ olefins, preferably $C_4$ to $C_{20}$ olefins, or preferably $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups.

Exemplary $C_2$ to $C_{40}$ olefin monomers and optional comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, preferably norbornene, norbornadiene, and dicyclopentadiene.

In some embodiments, where butene is the comonomer, the butene source may be a mixed butene stream comprising various isomers of butene. The 1-butene monomers are expected to be preferentially consumed by the polymerization process. Use of such mixed butene streams will provide an economic benefit, as these mixed streams are often waste streams from refining processes, for example, $C_4$ raffinate streams, and can therefore be substantially less expensive than pure 1-butene.

Polymerization processes of this invention can be carried out in any manner known in the art. Any suspension, homogeneous, bulk, solution, slurry, or gas phase polymerization process known in the art can be used. Such processes can be run in a batch, semi-batch, or continuous mode. Homogeneous polymerization processes and slurry processes are preferred. (A homogeneous polymerization process is defined to be a process where at least 90 wt % of the product is soluble in the reaction media.) A bulk homogeneous process is particularly preferred. (A bulk process is defined to be a process where monomer concentration in all feeds to the reactor is 70 volume % or more.) Alternately, no solvent or diluent is present or added in the reaction medium, (except for the small amounts used as the carrier for the catalyst system or other additives, or amounts typically found with the monomer; e.g., propane in propylene). In another embodiment, the process is a slurry process. As used herein the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_{4-10}$ alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt %, preferably less than 0.5 wt %, preferably less than 0 wt % based upon the weight of the solvents.

In a preferred embodiment, the feed concentration of the monomers and comonomers for the polymerization is 60 vol % solvent or less, preferably 40 vol % or less, or preferably 20 vol % or less, based on the total volume of the feedstream. Preferably the polymerization is run in a bulk process.

In some embodiments, the productivity is 4500 g/mmol/hour or more, preferably 5000 g/mmol/hour or more, preferably 10,000 g/mmol/hr or more, preferably 50,000 g/mmol/hr or more. In other embodiments, the productivity is at least 80,000 g/mmol/hr, preferably at least 150,000 g/mmol/hr, preferably at least 200,000 g/mmol/hr, preferably at least 250,000 g/mmol/hr, preferably at least 300,000 g/mmol/hr.

Preferred polymerizations can be run at any temperature and/or pressure suitable to obtain the desired ethylene polymers. Typical temperatures and/or pressures include a temperature in the range of from about 0° C. to about 300° C., preferably about 20° C. to about 200° C., preferably about 35° C. to about 150° C., preferably from about 40° C. to about 120° C., preferably from about 45° C. to about 80° C.; and at a pressure in the range of from about 0.35 MPa to about 10 MPa, preferably from about 0.45 MPa to about 6 MPa, or preferably from about 0.5 MPa to about 4 MPa.

In a typical polymerization, the run time of the reaction is up to 300 minutes, preferably in the range of from about 5 to 250 minutes, or preferably from about 10 to 120 minutes.

In some embodiments, hydrogen is present in the polymerization reactor at a partial pressure of 0.001 psig to 50 psig (0.007 kPa to 345 kPa), preferably from 0.01 psig to 25 psig (0.07 kPa to 172 kPa), more preferably 0.1 psig to 10 psig (0.7 kPa to 70 kPa).

In an alternate embodiment, the activity of the catalyst is at least 50 g/mmol/hour, preferably 500 or more g/mmol/hour, preferably 5000 or more g/mmol/hr, preferably 50,000 or more g/mmol/hr. In an alternate embodiment, the conversion of olefin monomer is at least 10%, based upon polymer yield and the weight of the monomer entering the reaction zone, preferably 20% or more, preferably 30% or more, preferably 50% or more, preferably 80% or more.

In a preferred embodiment, little or no alumoxane is used in the process to produce the polymers. Preferably, alumoxane is present at zero mol %, alternately the alumoxane is present at a molar ratio of aluminum to transition metal less than 500:1, preferably less than 300:1, preferably less than 100:1, preferably less than 1:1.

In a preferred embodiment, little or no scavenger is used in the process to produce the ethylene polymer. Preferably, scavenger (such as tri alkyl aluminum) is present at zero mol %, alternately the scavenger is present at a molar ratio of scavenger metal to transition metal of less than 100:1, preferably less than 50:1, preferably less than 15:1, preferably less than 10:1.

In a preferred embodiment, the polymerization: 1) is conducted at temperatures of 0° C. to 300° C. (preferably 25° C. to 150° C., preferably 40° C. to 120° C., preferably 45° C. to 80° C.); 2) is conducted at a pressure of atmospheric pressure to 10 MPa (preferably 0.35 MPa to 10 MPa, preferably from 0.45 MPa to 6 MPa, preferably from 0.5 MPa to 4 MPa); 3) is conducted in an aliphatic hydrocarbon solvent (such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof; preferably where aromatics are preferably present in the solvent at less than 1 wt %, preferably less than 0.5 wt %, preferably at 0 wt % based upon the weight of the solvents); 4) wherein the catalyst system used in the polymerization comprises less than 0.5 mol %, preferably 0 mol % alumoxane, alternately the alumoxane is present at a molar ratio of aluminum to transition metal less than 500:1, preferably less than 300:1, preferably less than 100:1, preferably less than 1:1) and comprises at least 0.1 mol % Lewis base modifier (preferably 0.5 to 1000 mol %, preferably 1 to 300 mol %); 5) the polymerization preferably occurs in one reaction zone; 6) the productivity of the catalyst compound is at least 80,000 g/mmol/hr (preferably at least 150,000 g/mmol/hr, preferably at least 200,000 g/mmol/hr, preferably at least 250,000 g/mmol/hr, preferably at least 300,000 g/mmol/hr); 7) optionally scavengers (such as trialkyl aluminum compounds) are absent (e.g., present at zero mol %, alternately the scavenger is present at a molar ratio of scavenger metal to transition metal of less than 100:1, preferably less than 50:1, preferably less than 15:1, preferably less than 10:1); and 8) optionally hydrogen is present in the polymerization reactor at a partial pressure of 0.001 psig to 50 psig (0.007 kPa to 345 kPa) (preferably from 0.01 psig to 25 psig (0.07 kPa to 172 kPa), more preferably 0.1 psig to 10 psig (0.7 kPa to 70 kPa)). In a preferred embodiment, the catalyst system used in the polymerization comprises no more than one catalyst compound. A "reaction zone," also referred to as a "polymerization zone," is a vessel where polymerization takes place, for example a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In a preferred embodiment, the polymerization occurs in one reaction zone. Room temperature is 23° C. unless otherwise noted.

Other additives may also be used in the polymerization, as desired, such as one or more scavengers, promoters, modifiers, chain transfer agents, reducing agents, oxidizing agents, hydrogen, aluminum alkyls, or silanes.

In other embodiments, the process described herein occurs in a reaction zone and the amount of Lewis base modifier present in the reaction zone is altered by increasing or decreasing the amount of Lewis base modifier in the reaction zone. Such increase may be performed by adding more of the same or different Lewis base modifiers to the reaction, causing in-situ formation of a Lewis base modifier, or by removing other reactants to cause a net increase in concentration of the Lewis base modifier. A decrease in Lewis base modifier may be caused by addition of other catalyst system components, by addition of an agent to complex or neutralize the Lewis base modifier, evaporation of the Lewis base modifier, catalyst decomposition, etc.

In a preferred embodiment, two or more, alternately three or more, alternately four or more Lewis base modifiers are used in the processes described herein. In a preferred embodiment, the process occurs in a reaction zone and the amount of Lewis base modifier present in the reaction zone is altered by introducing a different Lewis base modifier into the reaction zone. "Different" as used to refer to Lewis base modifiers indicates that the modifiers differ from each other by at least one atom or are different isomerically. For example, dimethylsec-butylamine is different from dimethylisobutylamine.

Polyolefin Products

Peak melting point (Tm) is determined by DSC as described in the experimental section below. Mw, Mn, Mw/Mn are determined by Gel Permeation Chromatography as described below in the Experimental section. Mol % [HHH] triad, mol % [EEE] triad, $r_1r_2$, run number, average ethylene run length, butyls per 1000 carbon atoms are determined by $^{13}$C NMR as described above. Density is determined by ASTM D 1505. Melt Index is determined by ASTM D 1238 (190° C., 2.16 kg).

This invention also relates to compositions of matter produced by the methods described herein.

In a preferred embodiment, the copolymer (preferably ethylene-alphaolefin copolymers such as ethylene-hexene copolymers or ethylene-octene copolymers) obtained by the processes described herein has a DSC peak melting temperature (Tm) of Y or more, where Y=134−(6.25*X), where X is the mol % comonomer, as determined by $^1$H NMR, alternately Y=135−(6.25*X), alternately Y=136−(6.25*X), alternately Y=137−(6.25*X), alternately Y=132−(5*X), alternately Y=132−(4*X), alternately Y=132−(3*X).

This invention also relates to ethylene alpha olefin copolymers having a Tm of 132° C. or more, preferably 134° C. or more, preferably 135° C. or more, preferably 136° C. or more.

In a preferred embodiment, the process described herein produces ethylene-alphaolefin copolymers (such as ethylene-hexene copolymers or ethylene-octene copolymers) having a Mw/Mn of greater than 1 to 4 (preferably greater than 1 to 3) and an $r_1r_2$ value of 1.0 or more (preferably greater than 1.1, preferably more than 1.2).

Likewise, the process of this invention produces olefin polymers, preferably polyethylene and polypropylene homopolymers and copolymers. In a preferred embodiment, the polymers produced herein are homopolymers of ethylene or propylene, are copolymers of ethylene preferably having from 0 mol % to 25 mol % (alternately from 0.5 mol % to 20 mol %, alternately from 1 mol % to 15 mol %, preferably from 3 mol % to 10 mol %) of one or more $C_3$ to $C_{20}$ olefin comonomer (preferably $C_3$ to $C_{12}$ alpha-olefin, preferably propylene, butene, hexene, octene, decene, dodecene, preferably propylene, butene, hexene, octene), or are copolymers of propylene preferably having from 0 mol % to 25 mol % (alternately from 0.5 mol % to 20 mol %, alternately from 1 mol % to 15 mol %, preferably from 3 mol % to 10 mol %) of one or more of $C_2$ or $C_4$ to $C_{20}$ olefin comonomer (preferably ethylene or $C_4$ to $C_{12}$ alpha-olefin, preferably ethylene, butene, hexene, octene, decene, dodecene, preferably ethylene, butene, hexene, octene).

In a preferred embodiment, the monomer is ethylene and the comonomer is hexene, preferably from 1 mol % to 15 mol % hexene, alternately 1 mol % to 10 mol %.

Typically, the polymers produced herein have an Mw of 5,000 to 1,000,000 g/mol (preferably 25,000 to 750,000 g/mol, preferably 50,000 to 500,000 g/mol), and/or an Mw/Mn of greater than 1 to 40 (alternately 1.2 to 20, alternately 1.3 to 10, alternately 1.4 to 5, alternatively 1.5 to 4, alternately 1.5 to 3).

In a preferred embodiment, the TREF trace of the copolymer produced herein is unimodal, not including any signal below the start of the temperature ramping. By "unimodal" is meant that the TREF trace has one peak or inflection point. An inflection point is that point where the second derivative of the curve changes in sign (e.g., from negative to positive or vice versa).

One method to determine the amount of copolymer present in a reactor effluent (absent solvent and unreacted monomer) is Soxhlet extraction. The Soxhlet extraction apparatus consists of a 400 ml Soxhlet extractor, with a widened overflow tube (to prevent siphoning and to provide constant flow extraction); a metal screen cage fitted inside the main Soxhlet chamber; a Soxhlet extraction thimble (Whatman, single thickness, cellulose) placed inside the screen cage; a condenser with cooling water and drain; and a one-neck 500 ml round bottom flask with appropriately sized stir bar and heating mantle.

For purposes of this invention and the claims thereto, the procedure to determine heptane solubles is as follows. Dry the Soxhlet thimbles in a 95° C. oven for approximately 60 minutes. Weigh the dry thimble directly after removal from oven; record this weight as A: Thimble Weight Before, in g. Weigh out 15-20 grams of sample (either in pellet or ground pellet form) into the thimble; record as B: Polymer Weight, in g. Place the thimble containing the polymer in the Soxhlet apparatus. Pour about 250 ml of HPLC-grade n-heptane into the round bottom flask with stir bar and secure the flask on the heating mantle. Connect the round bottom flask, the Soxhlet and the condenser in series. Pour more n-heptane down through the center of the condenser into the Soxhlet main chamber until the solvent level is just below the top of the overflow tube. Turn on the cooling water to the condenser. Turn on the heating mantle and adjust the setting to generate a rolling boil in the round bottom flask and maintain a good reflux. Allow to reflux for 48 hours. Turn the heat off but leave the cooling system on. Allow the system to cool down to room temperature. Disassemble the apparatus. Remove the thimble and rinse with a small amount of fresh n-heptane. Allow to air dry in the laboratory hood, followed by oven drying at 95° C. for 90 minutes. Weigh the thimble containing the polymer directly after removal from oven; record as C: Polymer/Thimble Weight After, in g. The weight of extracted polymer is determined by collecting all heptane solvent run through the Sohxlet, then removing the solvent (such as flashing the solvent off) and weighing the remaining polymer. This weight is then divided by the starting polymer weight (B) and multiplied by 100 to obtain wt % heptane soluble polymer.

In a preferred embodiment, the heptane soluble copolymer (obtained from Soxhlet extraction) has a Tm of 100° C. or more, preferably 110° C. or more, preferably 120° C. or more, 130° C. or more, preferably 135° C. or more.

In a preferred embodiment, the heptane soluble portion of the copolymer is present at 60 wt % or more, preferably 70 wt % or more, preferably 80 wt % or more, preferably 90 wt % or more, preferably 95 wt % or more, based upon the weight of the copolymer prior to Soxhlet extraction (e.g., B in the Sohxlet procedure above). Polymer B is the polymer obtained from the reactor before being combined with other polymers but optionally being combined with stabilizers and anti-oxidants.

Particularly useful ethylene copolymers produced herein, such as ethylene-butene, ethylene-hexene, and/or ethylene-octene copolymers, preferably have:

1) an [HHH] triad content of 0.0005 mol % or more (preferably 0.0006 mol % or more) where H is the comonomer (preferably butene, hexene or octene, preferably hexene); and/or 2) an $r_1 r_2$ value of 0.85 or more (alternately 0.94 or more, alternately 1.27 or more).

In another preferred embodiment, ethylene copolymers (particularly the ethylene-hexene copolymers) produced herein have: 1) a density in the range of from 0.910 g/cm$^3$ to 0.945 g/cm$^3$, preferably in the range of from 0.920 g/cm$^3$ to 0.940 g/cm$^3$, more preferably in the range of from 0.916 g/cm$^3$ to 0.917 g/cm$^3$; 2) an Mw of from about 10,000 to about 500,000 g/mol, preferably from about 10,000 to about 3200,000 g/mol, preferably from about 20,000 to about 200,000 g/mol, or from about 25,000 to about 150,000 g/mol; 3) an $M_w/M_n$ of from about 1.5 to about 5, particularly from about 2.0 to about 4.0, preferably from about 3.0 to about 4.0 or from about 2.5 to about 4.0; 4) a melt index of from about 0.1 g/10 min to about 1.5 g/10 min, preferably from about 0.2 g/10 min to about 1.2 g/10 min and most preferably from about 0.25 g/10 min to about 1 g/10 min; and 5) a melting point of about 115° C. to about 125° C., preferably from 115° C. to about 120° C.

In another preferred embodiment, ethylene copolymers (particularly the ethylene-hexene copolymers) produced herein may also have: 1) a content of [HHH] triads of more than 0.0001 mol % or more, preferably more than 0.0004 mol %, preferably 0.0006 mol % or more; and/or 2) at least 1 mol % (preferably at least 3 mol %, preferably at least 7 mol %) comonomer (preferably $C_3$ to $C_{20}$ olefin, preferably $C_4$ to $C_{12}$ alpha-olefin, preferably hexene, octene, and/or butene) as determined by $^{13}$C NMR; and/or 3) an $r_1 r_2$ value of 1.0 or more (preferably greater than 1.1, preferably more than 1.2); and/or 4) "butyls" per 1000 carbons of 7 or more (preferably 12 or more, preferably 15 or more, preferably 16 or more); and/or 5) a run number of 1.6 or more (preferably 2.6 or more, preferably 3.4 or more); and/or 6) an average ethylene run length of 0.28 or more (preferably 0.29 or more).

In some embodiments, the polymers produced herein exhibit a Tm as measured by differential scanning calorimetry ("DSC") of from 90° C. or more, preferably from 100° C. to 200° C., alternately from about 90° C. to about 130° C.

In another embodiment, the polymers produced herein contain less than 5 ppm hafnium, generally less than 2 ppm hafnium, preferably less than 1.5 ppm hafnium, more preferably less than 1 ppm hafnium. In an embodiment, the polymer produced herein contains in the range of from about 0.01 ppm to about 2 ppm hafnium, preferably in the range of from about 0.01 ppm to about 1.5 ppm hafnium, more preferably in the range of from about 0.01 ppm to 1 or less ppm hafnium, as determined using ICPES (Inductively Coupled Plasma Emission Spectrometry).

Blends

In another embodiment, the polymer (preferably the polyethylene) produced herein is combined with one or more additional polymers prior to being formed into a film, molded part or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In a preferred embodiment, the polymer (preferably the polyethylene) is present in the above blends, at from 10 wt % to 99 wt %, based upon the weight of the polymers in the blend, preferably 20 wt % to 95 wt %, even more preferably at least 30 wt % to 90 wt %, even more preferably at least 40 wt % to 90 wt %, even more preferably at least 50 wt % to 90 wt %, even more preferably at least 60 wt % to 90 wt %, even more preferably at least 70 wt % to 90 wt %.

The blends described above may be produced by mixing the polymers of the invention with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; and the like.

Films

Specifically, any of the foregoing polymers, such as the foregoing polyethylenes or blends thereof, may be used in a variety of end-use applications. Such applications include, for example, mono- or multi-layer blown, extruded, and/or shrink films. These films may be formed by any number of well known extrusion or coextrusion techniques, such as a blown bubble film processing technique, wherein the composition can be extruded in a molten state through an annular die and then expanded to form a uniaxial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents. The uniaxially orientation can be accomplished using typical cold drawing or hot drawing methods. Biaxial orientation can be accomplished using tenter frame equipment or a double bubble process and may occur before or after the individual layers are brought together. For example, a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. Typically the films are oriented in the Machine Direction (MD) at a ratio of up to 15, preferably between 5 and 7, and in the Transverse Direction (TD) at a ratio of up to 15, preferably 7 to 9. However, in another embodiment, the film is oriented to the same extent in both the MD and TD directions.

The films may vary in thickness depending on the intended application; however, films of a thickness from 1 µm to 50 µm are usually suitable. Films intended for packaging are usually from 10 µm to 50 µm thick. The thickness of the sealing layer is typically 0.2 µm to 50 µm. There may be a sealing layer on both the inner and outer surfaces of the film or the sealing layer may be present on only the inner or the outer surface.

In another embodiment, one or more layers may be modified by corona treatment, electron beam irradiation, gamma irradiation, flame treatment, or microwave. In a preferred embodiment, one or both of the surface layers is modified by corona treatment.

In another embodiment, this invention relates to:

1. A process to alter comonomer distribution in a copolymer (as compared to a copolymer made absent the Lewis base modifier) comprising contacting ethylene and one or more $C_3$ to $C_{40}$ comonomers; with a catalyst system comprising:

1) a Lewis base modifier present at greater than 1:1 molar ratio of Lewis base modifier to activator, where the Lewis base modifier is represented by the formula:

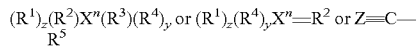

where, z is 0 or 1, y is 0 or 1, n is the valence of X and is 2 or 3, and z+y+2=n, X is a group 15-16 atom excluding oxygen, Z is N or P, $R^1$, $R^2$, $R^3$, $R^4$, and $R^5$ each, independently, are hydrogen, a heteroatom, a substituted heteroatom, or a substituted or unsubstituted alkyl or substituted or unsubstituted aryl, and $R^1$, $R^2$, $R^3$, and $R^4$ may form single or multinuclear rings with each other;

2) an activator; and 3) a metallocene catalyst compound represented by the formula:

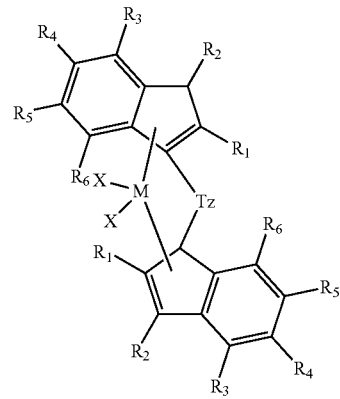

where:

M is a Group transition 4 metal; z is 1 indicating the presence of a bridging group T, each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system), each $R_1$ is, independently, hydrogen, or a $C_1$ to $C_{10}$ alkyl group, provided that at least one $R_1$ group is H; each $R_2$ is, independently, hydrogen, or a $C_1$ to $C_{10}$ alkyl group; each $R_3$, $R_4$, $R_5$, and $R_6$ is, independently, hydrogen, a substituted hydrocarbyl group, an unsubstituted hydrocarbyl group, or a heteroatom, provided that any of adjacent $R_3$, $R_4$, $R_5$, and $R_6$ groups may form a fused ring or multicenter fused ring system where the rings may be aromatic, partially saturated or saturated.

2. The process of paragraph 1, further comprising obtaining copolymer having an average $r_1r_2$ of at least 10% greater than the copolymer made under the same conditions without the Lewis base modifier present.

3. The process of paragraph 1 or 2, further comprising obtaining copolymer having a DSC peak melting temperature, Tm, of Y or more, where Y=134−(6.25*X), where X is the mol % comonomer.

4. The process of paragraph 1, 2, or 3, wherein no more than one metallocene catalyst compound is present in the catalyst system.

5. The process of any of paragraphs 1 to 4, wherein the Lewis base modifier is represented by the formula:

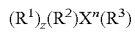

where, z is 0 or 1, n is the valence of X and is 2 or 3, X is N, S, or P, $R^1$, $R^2$, and $R^3$ each, independently, are hydrogen, a heteroatom, a substituted heteroatom, or a substituted or unsubstituted alkyl or substituted or unsubstituted aryl, and $R^1$, $R^2$, and $R^3$ may form single or multinuclear rings with each other.

6. The process of any of paragraphs 1 to 4, wherein the Lewis base modifier is represented by the formula:

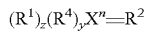

where, z is 0 or 1, y is 0 or 1, n is the valence of X and is 2 or 3, and z+y+2=n, X is N, S, or P, $R^1$, $R^2$, and $R^4$ each, independently, are hydrogen, a heteroatom, a substituted heteroatom, or a substituted or unsubstituted alkyl or substituted or unsubstituted aryl, and $R^1$, $R^2$, $R^3$, and $R^4$ may form single or multinuclear rings with each other.

7. The process of any of paragraphs 1 to 4, wherein the Lewis base modifier is represented by the formula:

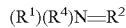

where, $R^1$, $R^2$, and $R^4$ each, independently, are hydrogen, a heteroatom, a substituted heteroatom, or a substituted or unsubstituted alkyl or substituted or unsubstituted aryl, and $R^1$, $R^2$, $R^3$, and $R^4$ may form single or multinuclear rings with each other.

8. The process of any of paragraphs 1 to 4, wherein the Lewis base modifier is represented by the formula:

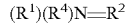

where, $R^1$, $R^2$, and $R^4$ each, independently, are hydrogen, methyl, ethyl propyl, butyl, pentyl, hexyl, heptyl, octyl, nonyl, decyl, undecyl, dodecyl, phenyl, substituted phenyl (such as tolyl), or isomers thereof, and $R^1$, $R^2$, $R^3$, and $R^4$ may form single or multinuclear rings with each other.

9. The process of any of paragraphs 1 to 4, wherein the Lewis base modifier comprises one or more of trimethylamine, ethyldimethylamine, diethylmethylamine, triethylamine, tripropylamine (including n-propyl, and isopropyl, and combinations thereof), dimethylpropylamine (including n-propyl, and isopropyl), diethylpropylamine (including n-propyl, and isopropyl), methyldipropylamine (including n-propyl, and isopropyl), ethyldipropylamine (including n-propyl, and isopropyl) tributylamine (including n-butyl, sec-butyl, isobutyl, and tert-butyl), dimethylbutylamine (including n-butyl, sec-butyl, isobutyl, and tert-butyl), dimethylphenylamine, diethylbutylamine (including n-butyl, sec-butyl, isobutyl, and tert-butyl), butyldipropylamine (including n-propyl, isopropyl, n-butyl, sec-butyl, isobutyl, and tert-butyl), dibutylpropylamine (including n-propyl, isopropyl, n-butyl, sec-butyl, isobutyl, and tert-butyl), methyldiphenylamine, triphenylamine, quinuclidine, 1,4-diazabicyclo[2.2.2]octane, pyridine, 4-(dimethylamino)pyridine, quinoline, isoquinoline, 1,2,3,4-tetrahydroquinoline, or acridine.

10. The process of any of paragraphs 1 to 9, wherein the Lewis base modifier is present at a molar ratio of X in the Lewis base modifier, as described in the formulae in paragraph 1, to transition metal in the catalyst compound of from 0.5:1 to 1000:1.

11. The process of any of paragraphs 1 to 10, wherein M is Hf, Ti, and/or Zr.

12. The process of any of paragraphs 1 to 11, wherein each X is, independently, selected from the group consisting of hydrocarbyl radicals having from 1 to 20 carbon atoms and halides.

13. The process of any of paragraphs 1 to 12, wherein all $R_1$ groups are hydrogen.

14. The process of any of paragraphs 1 to 12, wherein all $R_1$ groups are hydrogen and all $R_2$ groups are hydrogen.

15. The process of any of paragraphs 1 to 12, wherein all $R_1$ groups are hydrogen and all $R_2$ groups are, independently, hydrogen, methyl, ethyl, propyl, butyl, pentyl, hexyl, or an isomer thereof.

16. The process of any of paragraphs 1 to 15, wherein T is represented by one or more of the formulae: R'$_2$C, R'$_2$Si, R'$_2$Ge, R'$_2$CCR'$_2$, R'$_2$CCR'$_2$CR'$_2$, R'$_2$CCR'$_2$CR'$_2$CR'$_2$, R'C=CR', R'C=CR'CR'$_2$, R'$_2$CCR'=CR'CR'$_2$, R'C=CR'CR'=CR', R'C=CR'CR'$_2$CR'$_2$, R'$_2$CSiR'$_2$, R'$_2$SiSiR'$_2$, R$_2$CSiR'$_2$CR'$_2$, R'$_2$SiCR'$_2$SiR'$_2$, R'C=CR'SiR'$_2$, R'$_2$CGeR'$_2$, R'$_2$GeGeR'$_2$, R'$_2$CGeR'$_2$CR'$_2$, R'$_2$GeCR'$_2$GeR'$_2$, R'$_2$SiGeR'$_2$, R'C=CR'GeR'$_2$, R'$_2$B, R'$_2$C—BR', R'$_2$C—BR'—CR'$_2$, R'$_2$C—O—CR'$_2$, R'$_2$CR'$_2$C—O—CR'$_2$CR'$_2$, R'$_2$C—O—CR'$_2$CR'$_2$, R'$_2$C—O—CR'=CR', R'$_2$C—S—CR'$_2$, R'$_2$CR'$_2$C—S—CR'$_2$CR'$_2$, R'$_2$C—S—CR'$_2$CR'$_2$, R'$_2$C—S—CR'=CR', R'$_2$C—Se—CR'$_2$, R'$_2$CR'$_2$C—Se—CR'$_2$CR'$_2$, R'$_2$C—Se—CR$_2$CR'$_2$, R'$_2$C—Se—CR'=CR', R'$_2$C—N=CR', R'$_2$C—NR'—CR'$_2$, R'$_2$C—NR'—CR'$_2$CR'$_2$, R'$_2$C—NR'—CR'=CR', R'$_2$CR'$_2$C—NR'—CR'$_2$CR'$_2$, R'$_2$C—P'CR', and R'$_2$C—PR'—CR'$_2$ where R' is hydrogen or a $C_1$ to $C_{20}$ containing hydrocarbyl, substituted hydrocarbyl, halocarbyl, substituted halocarbyl, silylcarbyl or germylcarbyl substituent and optionally two or more adjacent R' may join to form a substituted or unsubstituted, saturated, partially unsaturated or aromatic, cyclic or polycyclic substituent.

17. The process of any of paragraphs 1 to 15, wherein T is selected from $CH_2$, $CH_2CH_2$, $C(CH_3)_2$, $SiMe_2$, $SiPh_2$, $SiMePh$, silylcyclobutyl ($Si(CH_2)_3$), $(Ph)_2C$, $(p-(Et)_3SiPh)_2C$, and silylcyclopentyl ($Si(CH_2)_4$), where Ph is phenyl, Me is methyl, and Et is ethyl.

18. The process of any of paragraphs 1 to 15, wherein T is formula $R_2{}^aJ$, where J is C, Si, or Ge, and each $R^a$ is, independently, hydrogen, halogen, $C_1$ to $C_{20}$ hydrocarbyl or a $C_1$ to $C_{20}$ substituted hydrocarbyl, and two $R^a$ can form a cyclic structure including aromatic, partially saturated, or saturated cyclic or fused ring system.

19. The process of any of paragraphs 1 to 18, wherein the metallocene compound comprises one or more of dimethylsilylbisindenyl hafnium dimethyl, dimethylsilylbisindenyl hafnium dichloride, dimethylsilylbisindenyl zirconium dimethyl, dimethylsilylbisindenyl zirconium dichloride, dimethylsilylbis(4,7-dimethylindenyl)hafnium dimethyl, dimethylsilylbis(4,7-dimethylindenyl)hafnium dichloride, dimethylsilylbis(4,7-dimethylindenyl), zirconium dimethyl, dimethylsilylbis(4,7-dimethylindenyl)zirconium dichloride, dimethylsilylbis(5,6-dimethylindenyl)hafnium dimethyl, dimethylsilylbis(5,6-dimethylindenyl)hafnium dichloride, dimethylsilylbis(5,6-dimethylindenyl), zirconium dimethyl, dimethylsilylbis(5,6-dimethylindenyl)zirconium dichloride, ethylenebisindenyl hafnium dimethyl, ethylenebisindenyl hafnium dichloride, ethylenebisindenyl zirconium dimethyl, ethylenebisindenyl zirconium dichloride, diphenylmethylenebisindenyl hafnium dimethyl, diphenylmethylenebisindenyl hafnium dichloride, diphenylmethylenebisindenyl zirconium dimethyl, and diphenylmethylenebisindenyl zirconium dichloride.

20. The process of any of paragraphs 1 to 19, wherein all $R_1$, $R_2$, and $R_3$ groups are hydrogen, and the $R_4$, $R_5$, and $R_6$ groups are H or a $C_1$ to $C_6$ alkyl or aryl.

21. The process of any of paragraphs 1 to 20, wherein the activator comprises alumoxane preferably present at the alumoxane is present at a molar ratio of aluminum to catalyst compound transition metal of 100:1.

22. The process of any of paragraphs 1 to 21, wherein the activator comprises a non-coordinating anion activator.

23. The process of paragraph 22, wherein activator is represented by the formula:

wherein Z is (L-H) or a reducible Lewis Acid, L is a neutral Lewis base; H is hydrogen; (L-H)$^+$ is a Bronsted acid; $A^{d-}$ is a non-coordinating anion having the charge d−; and d is an integer from 1 to 3.

24. The process of paragraph 22, wherein activator is represented by the formula:

wherein $A^{d-}$ is a non-coordinating anion having the charge d−; d is an integer from 1 to 3, and Z is a reducible Lewis acid represented by the formula: $(Ar_3C^+)$, where Ar is aryl or aryl substituted with a heteroatom, a $C_1$ to $C_{40}$ hydrocarbyl, or a substituted $C_1$ to $C_{40}$ hydrocarbyl.

25. The process of any of paragraphs 1 to 24, wherein the activator is one or more of: N,N-dimethylanilinium tetrakis(pentafluorophenyl)borate; triphenylcarbenium tetrakis(pentafluorophenyl)borate; trimethylammonium tetrakis(perfluoronaphthyl)borate; triethylammonium tetrakis(perfluoronaphthyl)borate; tripropylammonium tetrakis(perfluoronaphthyl)borate; tri(n-butyl)ammonium tetrakis(perfluoronaphthyl)borate; tri(t-butyl)ammonium tetrakis(perfluoronaphthyl)borate; N,N-dimethylanilinium tetrakis(perfluoronaphthyl)borate; N,N-diethylanilinium tetrakis(perfluoronaphthyl)borate; N,N-dimethyl-(2,4,6-trimethylanilinium)tetrakis(perfluoronaphthyl)borate; tropillium tetrakis(perfluoronaphthyl)borate; triphenylcarbenium tetrakis(perfluoronaphthyl)borate; triphenylphosphonium tetrakis(perfluoronaphthyl)borate; triethylsilylium tetrakis(perfluoronaphthyl)borate; benzene(diazonium)tetrakis(perfluoronaphthyl)borate; trimethylammonium tetrakis(perfluorobiphenyl)borate; triethylammonium tetrakis(perfluorobiphenyl)borate; tripropylammonium tetrakis(perfluorobiphenyl)borate; tri(n-butyl)ammonium tetrakis(perfluorobiphenyl)borate; tri(t-butyl)ammonium tetrakis(perfluorobiphenyl)borate; N,N-dimethylanilinium tetrakis(perfluorobiphenyl)borate; N,N-diethylanilinium tetrakis(perfluorobiphenyl)borate; N,N-dimethyl-(2,4,6-trimethylanilinium)tetrakis(perfluorobiphenyl)borate; tropillium tetrakis(perfluorobiphenyl)borate; triphenylcarbenium tetrakis(perfluorobiphenyl)borate; triphenylphosphonium tetrakis(perfluorobiphenyl)borate; triethylsilylium tetrakis(perfluorobiphenyl)borate; benzene(diazonium)tetrakis(perfluorobiphenyl)borate; [4-t-butyl-PhNMe$_2$H][(C$_6$F$_3$(C$_6$F$_5$)$_2$)$_4$B]; trimethylammonium tetraphenylborate; triethylammonium tetraphenylborate; tripropylammonium tetraphenylborate; tri(n-butyl)ammonium tetraphenylborate; tri(t-butyl)ammonium tetraphenylborate; N,N-dimethylanilinium tetraphenylborate; N,N-diethylanilinium tetraphenylborate; N,N-dimethyl-(2,4,6-trimethylanilinium)tetraphenylborate; tropillium tetraphenylborate; triphenylcarbenium tetraphenylborate; triphenylphosphonium tetraphenylborate; triethylsilylium tetraphenylborate; benzene(diazonium)tetraphenylborate; trimethylammonium tetrakis(pentafluorophenyl)borate; triethylammonium tetrakis(pentafluorophenyl)borate; tripropylammonium tetrakis(pentafluorophenyl)borate; tri(n-butyl)ammonium tetrakis(pentafluorophenyl)borate; tri(sec-butyl)ammonium tetrakis(pentafluorophenyl)borate; N,N-dimethylanilinium tetrakis(pentafluorophenyl)borate; N,N-diethylanilinium tetrakis(pentafluorophenyl)borate; N,N-dimethyl-(2,4,6-trimethylanilinium)tetrakis(pentafluorophenyl)borate; tropillium tetrakis(pentafluorophenyl)borate; triphenylcarbenium tetrakis(pentafluorophenyl)borate; triphenylphosphonium tetrakis(pentafluorophenyl)borate; triethylsilylium tetrakis(pentafluorophenyl)borate; benzene(diazonium)tetrakis(pentafluorophenyl)borate; trimethylammonium tetrakis-(2,3,4,6-tetrafluorophenyl)borate; triethylammonium tetrakis-(2,3,4,6-tetrafluorophenyl)borate; tripropylammonium tetrakis-(2,3,4,6-tetrafluorophenyl)borate; tri(n-butyl)ammonium tetrakis-(2,3,4,6-tetrafluoro-phenyl)borate; dimethyl(t-butyl)ammonium tetrakis-(2,3,4,6-tetrafluorophenyl)borate; N,N-dimethylanilinium tetrakis-(2,3,4,6-tetrafluorophenyl)borate; N,N-diethylanilinium tetrakis-(2,3,4,6-tetrafluorophenyl)borate; N,N-dimethyl-(2,4,6-trimethylanilinium)tetrakis-(2,3,4,6-tetrafluorophenyl)borate; tropillium tetrakis-(2,3,4,6-tetrafluorophenyl)borate; triphenylcarbenium tetrakis-(2,3,4,6-tetrafluorophenyl)borate; triphenylphosphonium tetrakis-(2,3,4,6-tetrafluorophenyl)borate; triethylsilylium tetrakis-(2,3,4,6-tetrafluorophenyl)borate; benzene(diazonium)tetrakis-(2,3,4,6-tetrafluorophenyl)borate; trimethylammonium tetrakis(3,5-bis(trifluoromethyl)phenyl)borate; triethylammonium tetrakis(3,5-bis(trifluoromethyl)phenyl)borate; tripropylammonium tetrakis(3,5-bis(trifluoromethyl)phenyl)borate; tri(n-butyl)ammonium tetrakis(3,5-bis(trifluoromethyl)phenyl)borate; tri(t-butyl)ammonium tetrakis(3,5-bis(trifluoromethyl)phenyl)borate; N,N-dimethylanilinium tetrakis(3,5-bis(trifluoromethyl)phenyl)borate; N,N-diethylanilinium tetrakis(3,5-bis(trifluoromethyl)phenyl)borate; N,N-dimethyl-(2,4,6-trimethylanilinium)tetrakis(3,5-bis(trifluoromethyl)phenyl)borate; tropillium tetrakis(3,5-bis(trifluoromethyl)phenyl)borate; triphenylcarbenium tetrakis(3,5-bis(trifluoromethyl)phenyl)borate; triphenylphosphonium tetrakis(3,5-bis(trifluoromethyl)phenyl)borate; triethylsilylium tetrakis(3,5-bis(trifluoromethyl)phenyl)borate; benzene(diazonium)tetrakis(3,5-bis(trifluoromethyl)phenyl)borate; di-(i-propyl)ammonium tetrakis(pentafluorophenyl)borate; dicyclohexylammonium tetrakis(pentafluorophenyl)borate; tri(o-tolyl)phosphonium tetrakis(pentafluorophenyl)borate; tri(2,6-dimethylphenyl)phosphonium tetrakis(pentafluorophenyl)borate; triphenylcarbenium tetrakis(perfluorophenyl)borate; 1-(4-(tris(pentafluorophenyl)borate)-2,3,5,6-tetrafluorophenyl)pyrrolidinium; tetrakis(pentafluorophenyl)borate; 4-(tris(pentafluorophenyl)borate)-2,3,5,6-tetrafluoropyridine; and triphenylcarbenium tetrakis(3,5-bis(trifluoromethyl)phenyl)borate).

26. The process of paragraph 1, wherein the process occurs at a temperature of from about 0° C. to about 300° C., at a pressure in the range of from about 0.35 MPa to about 10 MPa, and at a time up to 300 minutes.

27. The process of any of paragraphs 1 to 26, wherein the process occurs in a reaction zone and the amount of Lewis base modifier present in the reaction zone is altered by increasing or decreasing the amount of Lewis base modifier in the reaction zone.

28. The process of any of paragraphs 1 to 27, wherein the process occurs in a reaction zone and the amount of Lewis base modifier present in the reaction zone is altered by introducing a different Lewis base modifier into the reaction zone.

29. The process of any of paragraphs 1 to 28, further comprising obtaining copolymer having a single TREF trace and a DSC peak melting temperature, Tm, of Y or more, where Y=134−(6.25*X), where X is the mol % comonomer.

30. A process to produce block copolymers comprising contacting ethylene and one or more $C_3$ to $C_{40}$ comonomers; with a catalyst system comprising:

1) a Lewis base modifier present at greater than 1:1 molar ratio of Lewis base modifier to activator, where the Lewis base modifier is represented by the formula:

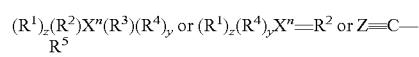

where, z is 0 or 1, y is 0 or 1, n is the valence of X and is 2 or 3, and z+y+2=n, X is a group 15-16 atom excluding oxygen, Z is N or P, $R^1$, $R^2$, $R^3$, $R^4$, and $R^5$ each, independently, are hydrogen, a heteroatom, a substituted heteroatom, or a substituted or unsubstituted alkyl or substituted or unsubstituted aryl, and $R^1$, $R^2$, $R^3$, and $R^4$ may form single or multinuclear rings with each other;

2) an activator; and 3) a metallocene catalyst compound represented by the formula:

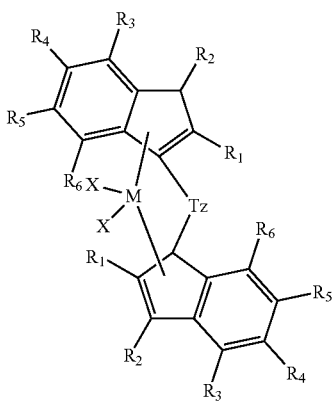

where:
M is a Group transition 4 metal; z is 1 indicating the presence of a bridging group T, each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system), each $R_1$ is, independently, hydrogen, or a $C_1$ to $C_{10}$ alkyl group, provided that at least one $R_1$ group is H; each $R_2$ is, independently, hydrogen, or a $C_1$ to $C_{10}$ alkyl group; each $R_3$, $R_4$, $R_5$, and $R_6$ is, independently, hydrogen, a substituted hydrocarbyl group, an unsubstituted hydrocarbyl group, or a heteroatom, provided that any of adjacent $R_3$, $R_4$, $R_5$, and $R_6$ groups may form a fused ring or multicenter fused ring system where the rings may be aromatic, partially saturated or saturated, wherein the process occurs in a reaction zone and the amount of Lewis base modifier present in the reaction zone is altered by increasing or decreasing the amount of Lewis base modifier in the reaction zone and/or by introducing a different Lewis base modifier into the reaction zone; and obtaining a copolymer having a single TREF trace and a DSC peak melting temperature, Tm, of Y or more, where Y=134− (6.25*X), where X is the mol % comonomer.

31. The process of any of paragraphs 1 to 30, wherein the comonomer comprises hexene.

32. The process of any of paragraphs 1 to 31, wherein the metallocene catalyst compound consists essentially of metallocene catalyst compounds that are not substantially different.

33. The process of any of paragraphs 1 to 31, wherein the metallocene catalyst compound consists essentially of metallocene catalyst compounds that are not different.

EXPERIMENTAL

Test Methods

Differential Scanning Calorimetry

Differential Scanning Calorimetry (DSC) measurements were performed on a TA-Q200 instrument to determine the melting point of the polymers. Samples were pre-equilibrated at 25° C., heated to 200° C. at a rate of 10° C./min, and then equilibrated at 200° C. for 10 min. The samples were then cooled to −20° C. at a rate of 10° C./min, followed by equilibration at −20° C. for 10 min. The samples were then again heated to 200° C. at a rate of 10° C./min. The melting temperatures (Tm's) reported are the peak melting temperatures from the second heat unless otherwise specified. For polymers displaying multiple peaks, the melting point (or melting temperature) is defined to be the peak melting temperature (i.e., associated with the largest endothermic calorimetric response in that range of temperatures) from the DSC melting trace.

$^1$H NMR $^1$H NMR data was collected at either room temperature or 120° C. (for purposes of the claims, 120° C. shall be used) in a 5 mm probe using a Varian spectrometer with a $^1$Hydrogen frequency of at least 400 MHz. Data was recorded using a maximum pulse width of 45°, 8 seconds between pulses and signal averaging 120 transients.

$^{13}$C NMR $^{13}$C NMR spectroscopic analysis is conducted as follows: Polymer samples for $^{13}$C NMR spectroscopy are dissolved with heating in $d_2$-1,1,2,2-tetrachloroethane at concentrations between 10 wt % to 15 wt % prior to being inserted into the spectrometer magnet. $^{13}$C NMR data is collected at 120° C. in a 10 mm probe using a Varian spectrometer with a $^1$Hydrogen frequency of 400 MHz. A 90 degree pulse, an acquisition time adjusted to give a digital resolution between 0.1 and 0.12 Hz, at least a 10 second pulse acquisition delay time with continuous broadband proton decoupling using swept square wave modulation without gating, is employed during the entire acquisition period. The spectra are acquired using time averaging to provide a signal to noise level adequate to measure the signals of interest. $^{13}$C NMR Chemical Shift Assignments and calculations involved in characterizing polymers are made as outlined in the work of M. R. Seger and G. Maciel, "Quantitative $^{13}$C NMR Analysis of Sequence Distributions in Poly(ethylene-co-1-hexene)", 2004, Anal. Chem., Vol. 76, pp. 5734-5747; J. C. Randall, "Polymer Sequence Determination: Carbon-13 NMR Method" Academic Press, New York, 1977; and K. L. Koenig "Chemical Microstructure of Polymer Chains," Robert E. Krieger Publishing Company, Florida, 1990.

Gel Permeation Chromatography (GPC)—Multiple Angle Light Scattering (MALLS)

Mw, Mn, and Mw/Mn are determined by using a High Temperature Size Exclusion Chromatograph (Polymer Laboratories), equipped with three in-line detectors, a differential refractive index detector (DRI), a light scattering (LS) detector, and a viscometer. Experimental details, including detector calibration, are described in: T. Sun, P. Brant, R. R. Chance, and W. W. Graessley, Macromolecules, Volume 34, Number 19, pp. 6812-6820, (2001) and references therein. Three Polymer Laboratories PLgel 10 mm Mixed-B LS columns are used. The nominal flow rate is 0.5 cm$^3$/min, and the nominal injection volume is 300 μL. The various transfer lines, columns and differential refractometer (the DRI detector) are contained in an oven maintained at 145° C. Solvent for the experiment is prepared by dissolving 6 grams of butylated hydroxy toluene as an antioxidant in 4 liters of Aldrich reagent grade 1, 2, 4 trichlorobenzene (TCB). The TCB mixture is then filtered through a 0.7 μm glass pre-filter and subsequently through a 0.1 μm Teflon filter. The TCB is then degassed with an online degasser before entering the Size Exclusion Chromatograph. Polymer solutions are prepared by placing dry polymer in a glass container, adding the desired amount of TCB, then heating the mixture at 160° C. with continuous agitation for about 2 hours. All quantities are measured gravimetrically. The TCB densities used to express the polymer concentration in mass/volume units are 1.463 g/ml at room temperature and 1.284 g/ml at 145° C. The injection concentration is from 0.75 to 2.0 mg/ml, with lower concentrations being used for higher molecular weight samples. Prior to running each sample the DRI detector and the injector are purged. Flow rate in the apparatus is then increased to 0.5 ml/minute, and the DRI is allowed to stabilize for 8 to 9 hours before injecting the first sample. The LS laser is turned on at least 1 hour before running the samples. The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the refractive index increment for the system. The refractive index, n=1.500 for TCB at 145° C. and λ=690 nm. For purposes of this invention and the claims thereto (dn/dc)=0.104 for propylene polymers, 0.0909 for butene polymers and 0.1 otherwise. Units on parameters throughout this description of the SEC method are such that concentration is expressed in g/cm$^3$, molecular weight is expressed in g/mole, and intrinsic viscosity is expressed in dL/g.

The LS detector is a Wyatt Technology High Temperature mini-DAWN. The molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2 A_2 c$$

Here, $\Delta R(\theta)$ is the measured excess Rayleigh scattering intensity at scattering angle θ, c is the polymer concentration determined from the DRI analysis, $A_2$ is the second virial coefficient, for purposes of this invention $A_2$=0.0006 for propylene polymers, 0.0015 for butene polymers and 0.001 otherwise, (dn/dc)=0.104 for propylene polymers, 0.0909 for butene polymers and 0.1 otherwise, P(θ) is the form factor for a monodisperse random coil, and $K_o$ is the optical constant for the system:

$$K_o = \frac{4 \pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and λ=690 nm.

A high temperature Viscotek Corporation viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the following equation:

$$\eta_s = c[\eta] + 0.3(c[\eta])^2$$

where c is concentration and was determined from the DRI output.

All molecular weights are weight average unless otherwise noted. All molecular weights are reported in g/mol unless otherwise noted.

Abbreviations used herein include:
Catalyst 1 is rac-dimethylsilyl bis(indenyl)hafnium dimethyl.
Lewis base modifier 2 (LBM-2) is dimethyl-n-butylamine.
Lewis base modifier 2A (LBM-2A) is dimethyl-sec-butylamine.
Lewis base modifier 2B (LBM-2B) is dimethyl-isobutylamine.
Lewis base modifier 2C (LBM-2C) is dimethyl-tert-butylamine
Activator 1 is N,N-dimethylanilinium tetrakis(pentafluorophenyl)borate.
Activator 2 is triphenylcarbenium tetrakis(pentafluorophenyl)borate.

EXAMPLE 1

General Procedures

Figure 2:
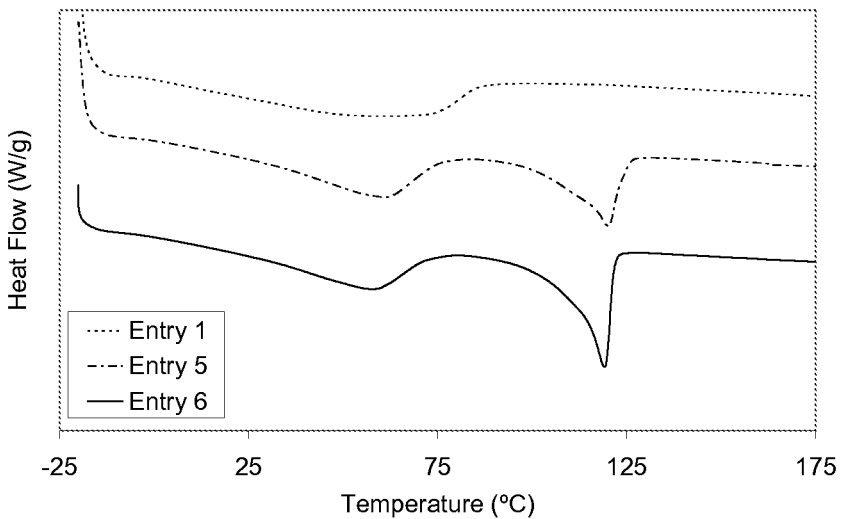
FIG. 2 is a graph of DSC traces of products from Table 1, Examples 1, 5, and 6.
Figure 3:
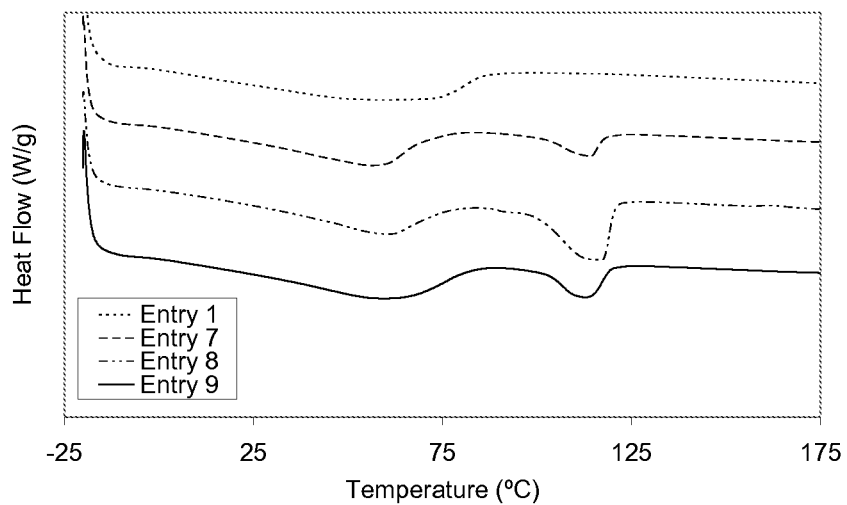
FIG. 3 is a graph of DSC traces of products from Table 1, Examples 1, 7, 8, and 9.
Figure 4:
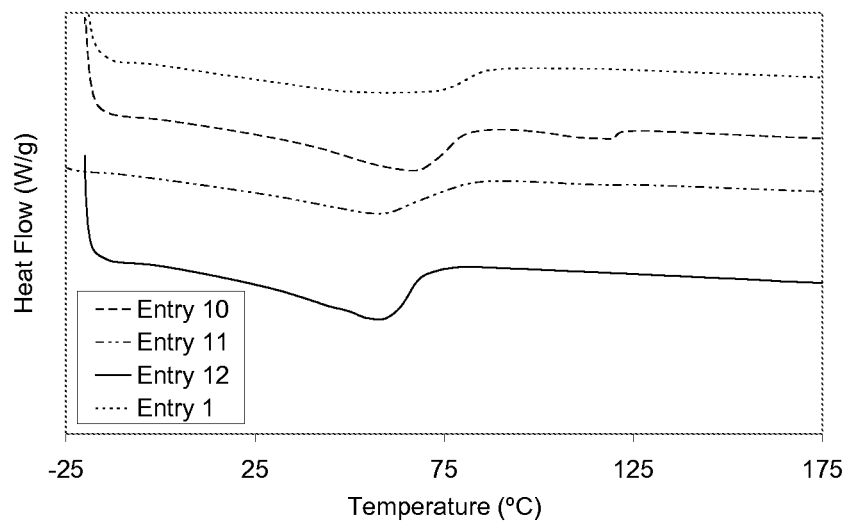
FIG. 4 is a graph of DSC traces of products from Table 1, Examples 1, 10, 11, and 12.
Figure 5:
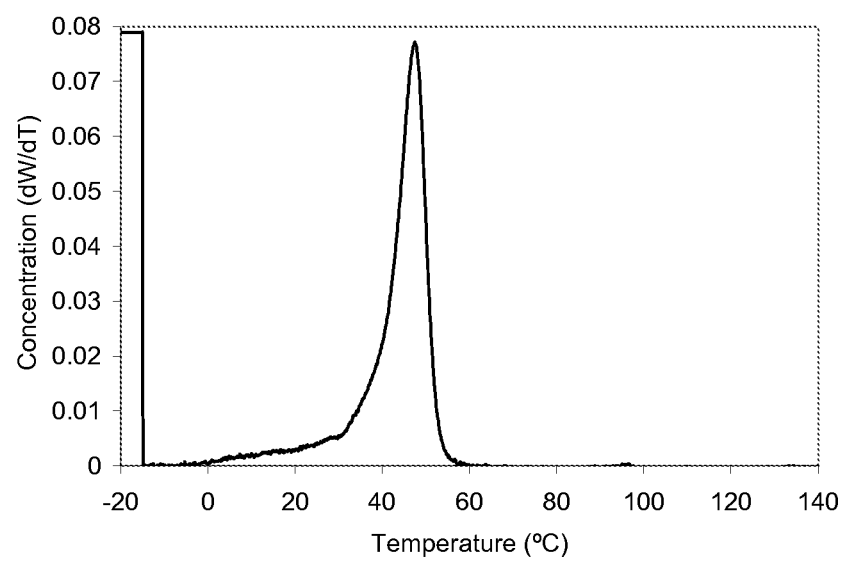
FIG. 5 is a TREF Chromatograph of product from Table 1, Example 4.

Under nitrogen purge, a 2 L autoclave was charged with isohexanes (700 mL), 1-hexene (30 mL) and TIBAL (tri-isobutylaluminum, Aldrich) (0.5 mL, 1.0 M in toluene). The autoclave was heated to temperature (80° C.), and allowed to stabilize. Ethylene was added (120 psig/0.83 MPa), and the catalyst system was then introduced as a pre-mixed solution of Catalyst 1 (1.0 mg), Activator 2 (1.86 mg), and Lewis base modifier (LBM 2) (0 to 10 molar equivalents) in toluene solution via catalyst tube with pressurized ethylene, such that the final pressure was 150 psig (1.03 MPa). After polymerization was complete, the autoclave contents were cooled to room temperature and the excess pressure vented. The contents were transferred into a glass or plastic container and volatiles were removed by a nitrogen purge. The polymer was dried in a vacuum at 70° C. overnight. Results are tabulated below in Table 1. A stack plot of the DSC data for the experiments tabulated in Table 1 is shown in FIGS. 1-4. The data suggest that increasing the amount of Lewis base present in the catalyst system leads to the appearance of a higher melting point peak, which is presumed to be due to segments rich in ethylene. TREF analysis of those samples with this higher melting point fraction (Ex 4) shows a single peak eluting as a soluble fraction. This is further evidence that the ethylene rich segments are chemically linked to the lower crystallinity ethylene-hexene segments.

TABLE 1

Data table for Example 1 Catalyst 1/Activator 2/LBM 2, 2A, 2B, or 2C at 80° C.

| Ex | Lewis Base | Lewis Base:Catalyst Ratio | Run time (min) | Yield (g) | Branches/ 1000 C.[b] | mol % Hexene[b] | Mw[c] | Mn[c] | Mw/Mn[c] | Activity (g/mmol cat h) | Tm[d] | $r_1 r_2$[e] |
|---|---|---|---|---|---|---|---|---|---|---|---|---|
| 1[a] | none | 0.0 | 1.75 | 49.81 | 44.0 | 10.7 | 297393 | 151655 | 1.96 | 845364 | 58.4 | 0.52 |
| 2 | LBM 2 | 2.4 | 2.42 | 42.84 | 41.0 | 9.8 | 429747 | 225254 | 1.91 | 525774 | 118.5 | 0.49 |
| 3 | LBM 2 | 4.9 | 10.03 | 18.65 | 37.0 | 8.7 | 386461 | 207706 | 1.86 | 55226 | 119.8 | 0.60 |
| 4 | LBM 2 | 7.3 | 10.03 | 1.99 | 30.0 | 6.8 | 398800 | 231390 | 1.72 | 5893 | 117.4 | 1.23 |
| 5 | LBM 2A | 2.4 | 10.02 | 9.44 | 40.0 | 9.5 | 356057 | 198153 | 1.80 | 27981 | 120.2 | |
| 6 | LBM 2A | 4.9 | 10.03 | 2.17 | 38.4 | 9.1 | 367222 | 191458 | 1.92 | 6426 | 121.1 | |

TABLE 1-continued

Data table for Example 1 Catalyst 1/Activator 2/LBM 2, 2A, 2B, or 2C at 80° C.

| Ex | Lewis Base | Lewis Base:Catalyst Ratio | Run time (min) | Yield (g) | Branches/ 1000 C.[b] | mol % Hexene[b] | Mw[c] | Mn[c] | Mw/Mn[c] | Activity (g/mmol cat h) | Tm[d] | $r_1r_2$[e] |
|----|----|----|----|----|----|----|----|----|----|----|----|----|
| 7  | LBM 2B | 2.4 | 10.02 | 6.58  | 30.1 | 6.8  | 275697 | 136057 | 2.03 | 19504 | 114.0 | |
| 8  | LBM 2B | 4.9 | 10.38 | 5.56  | 33.8 | 7.8  | 230356 | 68156  | 3.38 | 15909 | 117.2 | |
| 9  | LBM 2B | 7.3 | 10.02 | 16.20 | 38.9 | 9.2  | 286562 | 133865 | 2.14 | 48019 | 113.0 | |
| 10 | LBM 2C | 2.4 | 10.02 | 9.17  | 37.5 | 8.8  | 304339 | 167686 | 1.81 | 27181 | 66.4  | |
| 11 | LBM 2C | 4.9 | 10.02 | 18.80 | 40.5 | 9.7  | 313497 | 164266 | 1.91 | 55726 | 56.9  | |
| 12 | LBM 2C | 7.3 | 10.02 | 7.01  | 42.1 | 10.1 | 311329 | 171119 | 1.82 | 20779 | 57.8  | |

[a]For comparative purposes only, not part of the invention.
[b]$^1$H NMR.
[c]MALLS.
[d]DSC. Peak temperature of highest melting peak observed is reported in ° C.
[e]$^{13}$C NMR.

All documents described herein are incorporated by reference herein, including any priority documents and/or testing procedures to the extent they are not inconsistent with this text, provided however that any priority document not named in the initially filed application or filing documents is NOT incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law. Likewise whenever a composition, an element or a group of elements is preceded with the transitional phrase "comprising", it is understood that we also contemplate the same composition or group of elements with transitional phrases "consisting essentially of," "consisting of", "selected from the group consisting of," or "is" preceding the recitation of the composition, element, or elements and vice versa.

The invention claimed is:

1. A process to alter comonomer distribution in a copolymer (as compared to a copolymer made under the same conditions absent the Lewis base modifier) comprising contacting ethylene and one or more $C_3$ to $C_{40}$ comonomers; with a catalyst system consisting essentially of:

1) Lewis base modifier present at greater than 1:1 molar ratio of Lewis base modifier to activator, where the Lewis base modifier is represented by the formula:

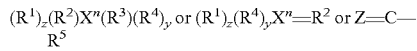

where, z is 0 or 1, y is 0 or 1, a is the valence of X and is 2 or 3, and z y 2 n, X is a group 15 atom, Z is N or P, $R^1$, $R^4$, and $R^5$ each, independently, are hydrogen, a heteroatom, a substituted heteroatom, or a substituted or unsubstituted alkyl or substituted gar unsubstituted aryl, $R^2$ and $R^3$ each, independently, are a heteroatom, a substituted heteroatom, or a substituted or unsubstituted alkyl or substituted or unsubstituted aryl, and $R^1$ and $R^2$ can form a single ring, $R^1$ and $R^4$ can form a single ring, $R^2$ and $R^3$ can form a single ring, and $R^3$ and $R^4$ can form a single ring;

2) activator and optional co-activator; and
3) metallocene catalyst compound represented by the formula:

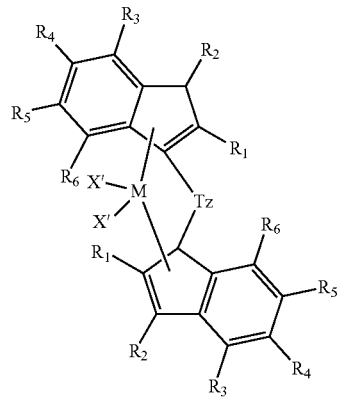

where;

M is a Group transition 4 metal; z is 1 indicating the presence of a bridging group T, each X' is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X' groups may form a part of a fused ring or a ring system), each R is, independently, hydrogen, or a $C_1$ to $C_{10}$ alkyl group, provided that at least one $R_1$ group is H; each $R_2$ is, independently, hydrogen, or a $C_1$ to $C_{10}$ alkyl group; each $R_3$, $R_4$, $R_5$, and $R_6$ is, independently, hydrogen, a substituted hydrocarbyl group, an unsubstituted hydrocarbyl group, or a heteroatom, provided that any of adjacent $R_3$, $R_4$, $R_5$, and $R_6$ groups may form a fused ring or multicenter fused ring system where the rings may be aromatic, partially saturated or saturated, wherein the process occurs at a temperature of from about 0° C. to about 120° C.

2. The process of claim 1, further comprising obtaining copolymer having an average $r_1r_2$ of at least 10% greater than the copolymer made under the same conditions without the Lewis base modifier present.

3. The process of claim 1, further comprising obtaining copolymer having a DSC peak melting temperature, Tm, of Y or more, where Y=134−(6.25*X"), where X is the mol % comonomer.

4. The process of claim 1, wherein no more than one metallocene catalyst compound is present in the catalyst system.

5. The process of claim 1, wherein the Lewis base modifier is represented by the formula:

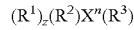

where, z is 0 or 1, n is the valence of X and is 2 or 3, X is N, air P, $R^1$ is hydrogen, a heteroatom, a substituted heteroatom, or a substituted or unsubstituted alkyl or substituted or unsubstituted aryl, $R^2$ and $R^3$ each, independently, are a heteroatom, a substituted heteroatom, or a substituted or unsubstituted alkyl or substituted or unsubstituted aryl, and $R^1$ and $R^2$ can form a single ring, and $R^2$ and $R^3$ can form a single ring.

6. The process of claim 1, wherein the Lewis base modifier is represented by the formula:

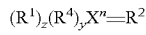

where, z is 0 or 1, y is 0 or 1, n is the valence of X and is 2 or 3, and z+y+2=n, X is N, S, or P, $R^1$, $R^2$, and $R^4$ each, independently, are hydrogen, a heteroatom, a substituted heteroatom, or a substituted or unsubstituted alkyl or substituted or unsubstituted aryl, and $R^1$ and $R^2$ can form a single ring, and $R^1$ and $R^4$ can form a single ring.

7. The process of claim 6, where, $R^1$, $R^2$, and $R^4$ each, independently, are hydrogen, a heteroatom, a substituted heteroatom, or a substituted or unsubstituted alkyl or substituted or unsubstituted aryl.

8. The process of claim 6, where, $R^1$, $R^2$, and $R^4$ each, independently, are hydrogen, methyl, ethyl propyl, butyl, pentyl, hexyl, heptyl, acetyl, decyl, undecyl, dodecyl, phenyl, substituted phenyl (such as tolyl), or isomers thereof.

9. The process of claim 1, wherein the Lewis base modifier comprises one or more of trimethylamine, ethyldimethylamine, diethylmethylamine, triethylamine, tripropylamine (including n-propyl, and isopropyl, and combinations thereof), dimethylpropylamine (including n-propyl, and isopropyl), diethylpropylamine (including n-propyl, and isopropyl), methyldipropylamine (including n-propyl, and isopropyl), ethyldipropylamine (including n-propyl, and isopropyl), tributylamine (including n-butyl, sec-butyl, and isobutyl), dimethylbutylamine (including n-butyl, sec-butyl, and isobutyl), dimethylphenylamine, diethylbutylamine (including n-butyl, sec-butyl, and isobutyl), butyldipropylamine (including n-propyl, isopropyl, n-butyl, sec-butyl, and isobutyl), dibutylpropylamine (including n-propyl, isopropyl, n-butyl, sec-butyl, and isobutyl), methyldiphenylamine, triphenylamine, pyridine, and 4-(dimethylamino)pyridine, quinoline, isoquinoline, 1,2,3,4-tetrahydroquinoline, or acridine.

10. The process of claim 1, wherein the Lewis base modifier is present at a molar ratio of X in the Lewis base modifier, as described in the formulae in claim 1, to transition metal in the catalyst compound of from 0.5:1 to 1000:1.

11. The process of claim 1, wherein M is Hf, Ti, and/or Zr.

12. The process of claim 1, wherein each X' is, independently, selected from the group consisting of hydrocarbyl radicals having from 1 to 20 carbon atoms and halides.

13. The process of claim 1, wherein all $R_1$ groups in the metallocene formula are hydrogen.

14. The process of claim 1, wherein all $R_1$ groups in the metallocene formula are hydrogen and all $R_2$ groups are hydrogen.

15. The process of claim 1, wherein all $R_1$ groups in the metallocene formula are hydrogen and all $R_2$ groups are, independently, hydrogen, methyl, ethyl, propyl, butyl, pentyl, hexyl, or an isomer thereof.

16. The process of claim 1, wherein T is represented by one or more of the formulae: $R'_2C$, $R'_2Si$, $R'_2Ge$, $R'_2CCR'_2$, $R'_2CCR'_2CR'_2$, $R'_2CCR'_2CR'_2CR'_2$, $R'C=CR'$, $R'C=CR'CR'_2$, $R'_2CCR'=CR'CR'_2$, $R'C=CR'CR'=CR'$, $R'C=CR'CR'_2CR'_2$, $R'_2CSiR'_2$, $R'_2SiSiR'_2$, $R_2CSiR'_2CR'_2$, $R'_2SiCR'_2SiR'_2$, $R'C=CR'SiR'_2$, $R'_2CGeR'_2$, $R'_2GeGeR'_2$, $R'_2CGeR'_2CR'_2$, $R'_2GeCR'_2GeR'_2$, $R'_2SiGeR'_2$, $R'C=CR'GeR'_2$, $R'B$, $R'_2C—BR'$, $R'_2C—BR'—CR'_2$, $R'_2C—O—CR'_2$, $R'_2CR'_2C—O—CR'_2CR'_2$, $R'_2C—O—CR'_2CR'_2$, $R'_2C—O—CR'=CR'$, $R'_2C—S—CR'_2$, $R'_2CR'_2C—S—CR'_2CR'_2$, $R'_2C—S—CR'_2CR'_2$, $R'_2C—S—CR'=CR'$, $R'_2C—Se—CR'_2$, $R'_2CR'_2C—Se—CR'_2CR'_2$, $R'_2C—Se—CR_2CR'_2$, $R'_2C—Se—CR'=CR'$, $R'_2C—N=CR'$, $R'_2C—NR'—CR'_2$, $R'_2C—NR'—CR'_2CR'_2$, $R'_2C—NR'—CR'=CR'$, $R'_2CR'_2C—NR'—CR'_2CR'_2$, $R'_2C—P=CR'$, and $R'_2C—PR'—CR'_2$ where R' is hydrogen or a $C_1$ to $C_{20}$ containing hydrocarbyl, substituted hydrocarbyl, halocarbyl, substituted halocarbyl, silylcarbyl or germylcarbyl substituent and optionally two or more adjacent R' may join to form a substituted or unsubstituted, saturated, partially unsaturated or aromatic, cyclic or polycyclic substituent.

17. The process of claim 1, wherein T is selected from $CH_2$, $CH_2CH_2$, $C(CH_3)_2$, $SiMe_2$, $SiPh_2$, SiMePh, silylcyclobutyl $(Si(CH_2)_3)$, $(Ph)_2C$, $(p\text{-}(Et)_3SiPh)_2C$, and silylcyclopentyl $(Si(CH_2)_4)$, where Ph is phenyl, Me is methyl, and a is ethyl.

18. The process of claim 1, wherein T is formula $R_2^aJ$, where J is C, Si, or Ge, and each $R^a$ is, independently, hydrogen, halogen, $C_1$ to $C_{20}$ hydrocarbyl or a $C_1$ to $C_{20}$ substituted hydrocarbyl, and two $R^a$ can form a cyclic structure including aromatic, partially saturated, or saturated cyclic or fused ring system.

19. The process of claim 1, wherein the metallocene compound comprises one or more of dimethylsilylbisindenyl hafnium dimethyl, dimethylsilylbisindenyl hafnium dichloride, dimethylsilylbisindenyl zirconium dimethyl, dimethylsilylbisindenyl zirconium dichloride, dimethylsilylbis(4,7-dimethylindenyl) hafnium dimethyl, dimethylsilylbis(4,7-dimethylindenyl) hafnium dichloride, dimethylsilylbis(4,7-dimethylindenyl), zirconium dimethyl, dimethylsitylbis(4,7-dimethylindenyl)zirconium dichloride, dimethylsilylbis(5,6-dimethylindenyl)hafnium dimethyl, dimethylsilylbis(5,6-dimethylindenyl) hafnium dichloride, dimethylsilylbis(5,6-dimethylindenyl), zirconium dimethyl, dimethylsilylbis(5,6-dimethylindenyl)zirconium dichloride, ethylenebisindenyl hafnium dimethyl, ethylenebisindenyl hafnium dichloride, ethylenebisindenyl zirconium dimethyl, ethylenebisindenyl zirconium dichloride, diphenylmethylenebisindenyl hafnium dimethyl, diphenylmethylenebisindenyl hafnium dichloride, diphenylmethylenebisindenyl zirconium dimethyl, and diphenylmethylenebisindenyl zirconium dichloride.

20. The process of claim 1, wherein all $R_1$, $R_2$, and $R_3$ groups in the metallocene formula are hydrogen, and the $R_4$, $R_5$, and $R_6$ groups are H or a $C_1$ to $C_6$ alkyl or aryl.

21. The process of claim 1, wherein the activator comprises alumoxane.

22. The process of claim 1, wherein alumoxane is present at a molar ratio of aluminum to catalyst compound transition metal of less than 100:1.

23. The process of claim 1, wherein the activator comprises a non-coordinating anion activator.

24. The process of claim 1, wherein the activator is represented by the formula:

$$(Z)_d^+(A^{d-})$$

wherein Z is (L-H) or a reducible Lewis Acid, L is a neutral Lewis base; H is hydrogen; $(L\text{-}H)^+$ is a Bronsted acid; $A^{d-}$ is a non-coordinating anion having the charge d−; and d is an integer from 1 to 3.

25. The process of claim 1, wherein the activator is represented by the formula:

$$(Z)_d^+(A^{d-})$$

wherein $A^{d-}$ is a non-coordinating anion having the charge d−; d is an integer from 1 to 3, and Z is a reducible Lewis acid represented by the formula: $(Ar_3C^+)$, where Ar is aryl or aryl substituted with a heteroatom, a $C_1$ to $C_{40}$ hydrocarbyl, or a substituted $C_1$ to $C_{40}$ hydrocarbyl.

26. The process of claim 1, wherein the activator is one or more of: N,N-dimethylanilinium tetrakis(pentafluorophenyl)borate; triphenylcarbenium tetrakis(pentafluorophenyl)borate; trimethylammonium tetrakis(perfluoronaphthyl)borate; triethylammonium tetrakis(perfluoronaphthyl)borate; tripropylammonium tetrakis(perfluoronaphthyl)borate; tri(n-butyl)ammonium tetrakis(perfluoronaphthyl)borate; tri(t-butyl)ammonium tetrakis(perfluoronaphthyl)borate; N,N-dimethylanilinium tetrakis(perfluoronaphthyl)borate; N,N-diethylanilinium tetrakis(perfluoronaphthyl)borate; N,N-dimethyl-(2,4,6-trimethylanilinium)tetrakis(perfluoronaphthyl)borate; tropillium tetrakis(perfluoronaphthyl)borate; triphenylcarbenium tetrakis(perfluoronaphthyl)borate; triphenylphosphonium tetrakis(perfluoronaphthyl)borate; triethylsilylium tetrakis(perfluoronaphthyl)borate; benzene(diazonium)tetrakis(perfluoronaphthyl)borate; trimethylammonium tetrakis(perfluorobiphenyl)borate; triethylammonium tetrakis(perfluorobiphenyl)borate; tripropylammonium tetrakis(perfluorobiphenyl)borate; tri(n-butyl)ammonium tetrakis(perfluorobiphenyl)borate; tri(t-butyl)ammonium tetrakis(perfluorobiphenyl)borate; N,N-dimethylanilinium tetrakis(perfluorobiphenyl)borate; N,N-diethylanilinium tetrakis(perfluorobiphenzyl)borate; N,N-dimethyl-(2,4,6-trimethylanilinium)tetrakis(perfluorobiphenzyl)borate; tropillium tetrakis(perfluorobiphenyl)borate; triphenylcarbenium tetrakis(perfluorobiphenyl)borate; triphenylphosphonium tetrakis(perfluorobiphenyl)borate; triethylsilylium tetrakis(perfluorobiphenyl)borate; benzene(diazonium)tetrakis(perfluorobiphenyl)borate; [4-t-butyl-PhNMe$_2$H][C$_6$F$_3$(C$_6$F$_5$)$_2$)$_4$B]; trimethylammonium tetraphenylborate; triethylammonium tetraphenylborate; tripropylammonium tetraphenylborate; tri(n-butyl)ammonium tetraphenylborate; tri(t-butyl)ammonium tetraphenylborate; N,N-dimethylanilinium tetraphenylborate; N,N-diethylanilinium tetraphenylborate; N,N-dimethyl-(2,4,6-trimethylanilinium)tetraphenylborate; tropillium tetraphenylborate; triphenylcarbenium tetraphenylborate; triphenylphosphonium tetraphenylborate; triethylsilylium tetraphenylborate; benzene(diazonium)tetraphenylborate; trimethylammonium tetrakis(pentafluorophenyl)borate; triethylammonium tetrakis(pentafluorophenyl)borate; tripropylammonium tetrakis(pentafluorophenyl)borate; tri(n-butyl)ammonium tetrakis(pentafluorophenyl)borate; tri(sec-butyl)ammonium tetrakis(pentafluorophenyl)borate; N,N-dimethylanilinium tetrakis(pentafluorophenyl)borate; N,N-diethylanilinium tetrakis(pentafluorophenyl)borate; N,N-dimethyl-(2,4,6-trimethylanilinium)tetrakis(pentafluorophenyl)borate; tropillium tetrakis(pentafluorophenyl)borate; triphenylcarbenium tetrakis(pentafluorophenyl)borate; triphenylphosphonium tetrakis(pentafluorophenyl)borate; triethylsilylium tetrakis(pentafluorophenyl)borate; benzene(diazonium)tetrakis(pentafluorophenyl)borate; trimethylammonium tetrakis-(2,3,4,6-tetrafluorophenyl)borate; triethylammonium tetrakis-(2,3,4,6-tetrafluorophenyl)borate; tripropylammonium tetrakis-(2,3,4,6-tetrafluorophenyl)borate; tri(n-butyl)ammonium tetrakis-(2,3,4,6-tetrafluoro-phenyl)borate; dimethyl(t-butyl)ammonium tetrakis-(2,3,4,6-tetrafluorophenyl)borate; N,N-dimethylanilinium tetrakis-(2,3,4,6-tetrafluorophenyl)borate; N,N-diethylanilinium tetrakis-(2,3,4,6-tetrafluorophenyl)borate; N,N-dimethyl-(2,4,6-trimethylanilinium)tetrakis-(2,3,4,6-tetrafluorophenyl)borate; tropillium tetrakis-(2,3,4,6-tetrafluorophenyl)borate; triphenylcarbenium tetrakis-(2,3,4,6-tetrafluorophenyl)borate; triphenylphosphonium tetrakis-(2,3,4,6-tetrafluorophenyl)borate; triethylsilylium tetrakis-(2,3,4,6-tetrafluorophenyl)borate; benzene(diazonium)tetrakis-(2,3,4,6-tetrafluorophenyl)borate; trimethylammonium tetrakis(3,5-bis(trifluoromethyl)phenyl)borate; triethylammonium tetrakis(3,5-bis(trifluoromethyl)phenyl)borate; tripropylammonium tetrakis(3,5-bis(trifluoromethyl)phenyl)borate; tri(n-butyl)ammonium tetrakis(3,5-bis(trifluoromethyl)phenyl)borate; tri(t-butyl)ammonium tetrakis(3,5-bis(trifluoromethyl)phenyl)borate; N,N-dimethylanilinium tetrakis(3,5-bis(trifluoromethyl)phenyl)borate; N,N-diethylanilinium tetrakis(3,5-bis(trifluoromethyl)phenyl)borate; N,N-dimethyl-(2,4,6-trimethylanilinium)tetrakis(3,5-bis(trifluoromethyl)phenyl)borate; tropillium tetrakis(3,5-bis(trifluoromethyl)phenyl)borate; triphenylcarbenium tetrakis(3,5-bis(trifluoromethyl)phenyl)borate; triphenylphosphonium tetrakis(3,5-bis(trifluoromethyl)phenyl)borate; triethylsilylium tetrakis(3,5-bis(trifluoromethyl)phenyl)borate; benzene(diazonium)tetrakis(3,5-bis(trifluoromethyl)phenyl)borate; di-(i-propyl)ammonium tetrakis(pentafluorophenyl)borate; dicyclohexylammonium tetrakis(pentafluorophenyl)borate; tri(o-tolyl)phosphonium tetrakis(pentafluorophenyl)borate; tri(2,6-dimethylphenyl)phosphonium tetrakis(pentafluorophenyl)borate; triphenylcarbenium tetrakis(perfluorophenyl)borate; 1-(4-(tris(pentafluorophenyl)borate)-2,3,5,6-tetrafluorophenyl)pyrrolidinium; tetrakis(pentafluorophenyl)borate; 4-(tris(pentafluorophenyl)borate)-2,3,5,6-tetrafluoropyridine; and triphenylcarbenium tetrakis(3,5-bis(trifluoromethyl)phenyl)borate).

27. The process of claim 1, wherein the process occurs at a temperature of from about 25° C. to about 120° C., at a pressure in the range of from about 0.35 MPa to about 10 MPa, and at a time up to 300 minutes.

28. The process of claim 1, wherein the process occurs in a reaction zone and the amount of Lewis base modifier present in the reaction zone is altered by increasing or decreasing the amount of Lewis base modifier in the reaction zone.

29. The process of claim 1, wherein the process occurs in a reaction zone and the amount of Lewis base modifier present in the reaction zone is altered by introducing a different Lewis base modifier into the reaction zone.

30. The process of claim 1, further comprising obtaining copolymer having a single peak in the TREF trace and a DSC peak melting temperature, Tm, of or more where Y=134−(6.25*X), where X is the mol % comonomer.

31. The process of claim 1, wherein the metallocene catalyst compound consists essentially of metallocene catalyst compounds that are not substantially different.

32. The process of claim 1, wherein the metallocene catalyst compound consists essentially of metallocene catalyst compounds that are not different.

33. The process of claim 1, further comprising obtaining copolymer having an average $r_1r_2$ of at least 30% greater than the copolymer made under the same conditions without the Lewis base modifier present.

34. The process of claim 1, further comprising obtaining copolymer having an average $r_1r_2$ of at least 50% greater than the copolymer made under the same conditions without the Lewis base modifier present.

35. The process of claim 1, further comprising obtaining copolymer having an average $r_1r_2$ of at least 75% greater than the copolymer made under the same conditions without the Lewis base modifier present.

36. The process of claim 1, further comprising obtaining copolymer having an average $r_1r_2$ of at least 100% greater than the copolymer made under the same conditions without the Lewis base modifier present.

37. The process of claim 1, further comprising obtaining copolymer having a Tm of 100 to 200° C.

38. The process of claim 1 wherein the process to contact the ethylene, comonomer and catalyst system is a homogeneous polymerization process.

39. The process of claim 1 wherein the process to contact the ethylene, comonomer and catalyst system is a solution polymerization process.

40. The process of claim 1 wherein the ethylene copolymer has:
1) an [HHH] triad content of 0.0005 mol % or more, where H is the comonomer; and/or
2) an $r_1 r_2$ value of 0.85 or more.

41. The process of claim 1, wherein the Lewis base modifier has an N''' from 1 to 6.

42. The process of claim 1, wherein the Lewis base modifier has an N''' from 2 to 6.

43. A process to alter comonomer distribution in a copolymer (as compared to a copolymer made under the same conditions absent the Lewis base modifier) comprising contacting ethylene and one or more $C_3$ to $C_{40}$ comonomers; with a catalyst system comprising:
1) a Lewis base modifier present at greater than 1:1 molar ratio of Lewis base modifier to activator, where the Lewis base modifier is represented by the formula:

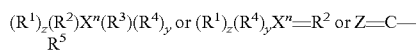

where, z is 0 or 1, y is 0 or 1, n is the valence of X and is 2 or 3, and z+y+2n, X is a group 15 atom, Z is N or P, $R^1$, $R^2$, $R^3$, $R^4$, and $R^5$ each, independently, are hydrogen, a heteroatom, a substituted heteroatom, or a substituted or unsubstituted alkyl or substituted or unsubstituted aryl, and $R^1$, $R^2$, $R^3$, and $R^4$ may form single or multinuclear rings with each other;
2) a non-coordinating anion activator; and
3) a metallocene catalyst compound represented by the formula:

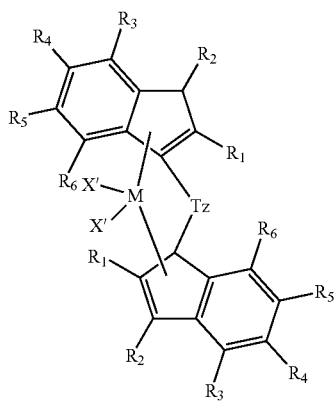

where:
M is a Group transition 4 metal; z is 1 indicating the presence of a bridging group T, each X' is, independently, selected from the group consisting of hydrocarbyl radicals having from 1 to 20 carbon atoms, hydrides, amides, alkoxides, sulfides, phosphides, halides, dimes, amines, phosphines, ethers, and a combination thereof, (two X' groups may form a part of a fused ring or a ring system), each $R_1$ is, independently, hydrogen, or a $C_1$ to $C_{10}$ alkyl group, provided that at least one $R_1$ group is H; each $R_2$ is, independently, hydrogen, or a $C_1$ to $C_{10}$ alkyl group; each $R_3$, $R_4$, $R_5$, and $R_6$ is, independently, hydrogen, a substituted hydrocarbyl group, an unsubstituted hydrocarbyl group, or a heteroatom, provided that any of adjacent $R_3$, $R_4$, $R_5$, and $R_6$ groups may form a fused ring or multicenter fused ring system where the rings may be aromatic, partially saturated or saturated.

44. The process of claim 1 wherein $R^2$ and $R^3$ are independently, methyl, ethyl, n-propyl, isopropyl, n-butyl, sec-butyl, or isobutyl.

45. The process of claim 1, wherein the activator comprises a non-coordinating anion activator selected from the group consisting on N,N-dimethylanilinium tetrakis(pentafluorophenyl)borate; triphenylcarbenium tetrakis(pentafluorophenyl)borate; and N,N-dimethylanilinium tetrakis(perfluoronaphthyl)borate.

46. The process of claim 1 wherein the process to contact the ethylene, comonomer and catalyst system is present in a slurry polymerization process.

47. The process of claim 1 wherein the copolymer obtained has a DSC peak melting temperature, Tin, of Y or more, where Y=137−(6.25*X''), where X'' is the mol % comonomer.

48. The process of claim 43, wherein the copolymer obtained has an average $r_1 r_2$ of at least 10% greater than the copolymer made under the same conditions without the Lewis base modifier present.

49. The process of claim 1, further comprising obtaining copolymer having a one or two peaks in the TREF trace and a DSC peak melting temperature, Tm, of Y or more, where Y=132−(5*X), where X is the mol % comonomer.

50. The process of claim 1, further comprising obtaining copolymer having a single peak in the TREF trace and a DSC peak melting temperature, Tm, of Y or more, where Y=132−(5*X), where X is the mol % comonomer.

* * * * *